(12) United States Patent
Iyer et al.

(10) Patent No.: US 12,166,384 B2
(45) Date of Patent: Dec. 10, 2024

(54) HIGH PERFORMANCE ELECTROMAGNETIC MACHINE AND COOLING SYSTEM

(71) Applicants: MAGNA INTERNATIONAL INC., Aurora (CA); Lakshmi Varaha Iyer, Troy, MI (US); Gerd Schlager, Sankt Valentin (AT); Alexander Exl, Sankt Valentin (AT); Mitch Reedy, Troy, MI (US)

(72) Inventors: Lakshmi Varaha Iyer, Troy, MI (US); Gerd Schlager, Sankt Valentin (AT); Alexander Exl, Sankt Valentin (AT); Mitch Reedy, Troy, MI (US)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 480 days.

(21) Appl. No.: 17/440,860

(22) PCT Filed: Mar. 19, 2020

(86) PCT No.: PCT/US2020/023573
§ 371 (c)(1),
(2) Date: Sep. 20, 2021

(87) PCT Pub. No.: WO2020/191167
PCT Pub. Date: Sep. 24, 2020

(65) Prior Publication Data
US 2022/0166275 A1 May 26, 2022

Related U.S. Application Data

(60) Provisional application No. 62/820,529, filed on Mar. 19, 2019, provisional application No. 62/869,242, filed on Jul. 1, 2019.

(51) Int. Cl.
*H02K 1/27* (2022.01)
*H02K 1/276* (2022.01)
(Continued)

(52) U.S. Cl.
CPC ......... *H02K 1/2773* (2013.01); *H02K 1/278* (2013.01); *H02K 3/24* (2013.01); *H02K 3/522* (2013.01); *H02K 9/19* (2013.01)

(58) Field of Classification Search
CPC ........ H02K 1/2773; H02K 1/278; H02K 3/24; H02K 3/522; H02K 9/19; H02K 1/2766
See application file for complete search history.

(56) References Cited

U.S. PATENT DOCUMENTS

| 4,007,387 A | 2/1977 | Rustecki |
| 4,691,133 A | 9/1987 | Mongeau |

(Continued)

FOREIGN PATENT DOCUMENTS

| BE | 1015432 A3 | 3/2005 |
| DE | 102009025929 A1 | 12/2010 |

(Continued)

OTHER PUBLICATIONS

European Search report from the European Patent Office for related European Patent Application No. 20773103.5 dated May 24, 2022, 12 page(s).

(Continued)

*Primary Examiner* — Thomas Truong
(74) *Attorney, Agent, or Firm* — Dickinson Wright PLLC

(57) ABSTRACT

An electromagnetic machine includes a stator that includes a back plate and a plurality of electrical conductors radially disposed on the back plate. The electromagnetic machine also includes a rotor that includes a body having an outer diameter corresponding to an inner diameter of the stator and at least one magnet having a first end disposed proxi- (Continued)

mate the stator and a second end disposed opposite the first end. The electromagnetic machine also includes an engaging member disposed on a shaft that extends axially relative to the rotor, the engaging member being configured to engage at least one recessed portion of the rotor.

2 Claims, 16 Drawing Sheets

(51) Int. Cl.
*H02K 1/278* (2022.01)
*H02K 1/28* (2006.01)
*H02K 3/24* (2006.01)
*H02K 3/52* (2006.01)
*H02K 9/19* (2006.01)

(56) References Cited

U.S. PATENT DOCUMENTS

| | | |
|---|---|---|
| 9,178,391 B2 | 11/2015 | Claramunt Estecha et al. |
| 2002/0149275 A1* | 10/2002 | Gauthier ............... H02K 29/08 310/68 B |
| 2008/0061637 A1* | 3/2008 | Gamble ................. H02K 3/47 310/214 |
| 2011/0121668 A1 | 5/2011 | Condamin et al. |
| 2012/0001509 A1 | 1/2012 | Yamada et al. |
| 2014/0042841 A1 | 2/2014 | Rippel et al. |
| 2014/0265703 A1* | 9/2014 | Yamada ................. H02K 1/24 310/156.38 |
| 2014/0300220 A1* | 10/2014 | Marvin .................. H02K 3/24 29/596 |
| 2015/0091406 A1* | 4/2015 | Tajima ................ H02K 1/2773 310/156.38 |
| 2015/0288254 A1 | 10/2015 | Söderholm et al. |
| 2015/0372549 A1* | 12/2015 | Pan ........................ H02K 1/146 310/156.56 |
| 2016/0087496 A1* | 3/2016 | Pannier ............... H02K 1/2773 310/156.56 |
| 2016/0254714 A1 | 9/2016 | Hashizume |
| 2016/0372983 A1* | 12/2016 | Okochi .................... H02K 1/32 |
| 2017/0194838 A1* | 7/2017 | Marvin ................ H02K 15/026 |
| 2018/0034332 A1* | 2/2018 | Takahashi ............... H02K 9/19 |
| 2018/0351426 A1 | 12/2018 | Deng |
| 2018/0367000 A1 | 12/2018 | Mikami et al. |
| 2018/0367011 A1 | 12/2018 | Bodla et al. |

FOREIGN PATENT DOCUMENTS

| | | |
|---|---|---|
| DE | 102015012913 A1 | 4/2017 |
| EP | 2360816 A1 | 8/2011 |
| WO | 2014104819 A1 | 7/2014 |
| WO | 2018218314 A1 | 12/2018 |
| WO | 2019001992 A1 | 1/2019 |

OTHER PUBLICATIONS

Partial Supplementary European Search Report mailed Mar. 11, 2022 for European Application No. 20773103.5, 10 pages.

* cited by examiner

HIGH PERFORMANCE ELECTROMAGNETIC MACHINE AND COOLING SYSTEM

CROSS-REFERENCE TO RELATED APPLICATIONS

This U.S. National Stage Patent Application claims the benefit of PCT International Patent Application Serial No. PCT/US2020/023573 filed Mar. 19, 2020 entitled "HIGH PERFORMANCE ELECTROMAGNETIC MACHINE AND COOLING SYSTEM" which claims the benefit of and priority to U.S. Provisional Patent Application Ser. No. 62/820,529, filed Mar. 19, 2019, titled "High Performance Electromagnetic Machine" and U.S. Provisional Patent Application Ser. No. 62/869,242, filed Jul. 1, 2019, titled "Direct Cooling For Electric Machines," the entire disclosures of which are hereby incorporated by reference.

TECHNICAL FIELD

The present disclosure relates generally to electromagnetic machines, and in particular, electric machines having permanent magnet rotors and cooling systems for the electromagnetic machines.

BACKGROUND

Electromagnetic machines, such as electric motors or generators, commonly include a stationary part called a stator. Energy flows through the stator to or from a rotating component, such as a rotor that rotates. Stators commonly include one or more electrical conductors comprising a core wound in conductive wire. The rotating component typically includes one or more permanent magnets radially disposed on the rotor. An electrical current is applied or induced in the electrical conductors to generate a magnetic field that transfers energy to or from the rotating component, which may cause the rotating component to rotate. Such electromagnetic machines (e.g., referred to as permanent magnet machines or permanent magnet motors) typically yield desirable characteristics, such as high specific torque, high specific power, high efficiency, and low torque ripple. However, manufacturing costs of such electromagnetic machines (e.g., comprising permanent magnets) may be relatively high.

SUMMARY

This disclosure relates generally to electromagnetic machines.

Aspects of the disclosed embodiments include an electromagnetic machine that includes a stator that includes a back plate and a plurality of electrical conductors radially disposed on the back plate. The electromagnetic machine also includes a rotor that includes a body having an outer diameter corresponding to an inner diameter of the stator and at least one magnet having a first end disposed proximate the stator and a second end disposed opposite the first end. The electromagnetic machine also includes an engaging member disposed on a shaft that extends axially relative to the rotor, the engaging member being configured to engage at least one recessed portion of the rotor.

According to some embodiments, an electric machine comprises a stator, which includes a core. The core includes a yoke having a plurality of teeth extending radially from the yoke. The core defines a slot between two adjacent ones of the teeth. A first winding of electrically-conductive material extends through the slot adjacent a first one of the teeth. A second winding of electrically-conductive material extends through the slot adjacent a second one of the teeth. A cooling channel extends through the slot and is configured to convey a coolant fluid for removing heat from the stator.

According to some embodiments, an electric machine comprises a stator, which includes a core. The core includes a yoke having an annular cross-section and a plurality of teeth extending radially from the yoke. A slot is defined between two adjacent ones of the teeth. A winding of electrically-conductive material extends through the slot. A coil carrier of non-conductive material extends through the slot between the winding and an adjacent one of the teeth. The coil carrier defines a cooling channel extending through the slot between the winding and the adjacent one of the teeth. The cooling channel is configured to convey a coolant fluid for removing heat from the stator.

According to some embodiments, an electric machine comprises a stator and a rotor configured to rotate relative to the stator. An air gap is defined between the rotor and the stator. The rotor includes a body and a plurality of permanent magnets disposed upon the body and adjacent to the air gap. The rotor defines a trough extending circumferentially between adjacent ones of the permanent magnets. The trough also extends radially from the body toward the stator. A cooling channel extends through the trough and is configured to convey a coolant fluid.

According to some embodiments, an electric machine comprises a stator and a rotor configured to rotate about an axis. A heat pipe includes an evaporator tube extending axially through the rotor. The heat pipe also includes condenser disposed at or adjacent to an axial end of the rotor. The heat pipe is configured to absorb heat from the rotor by evaporating a refrigerant within the evaporator tube. The heat pipe is also configured to transfer the heat away from the rotor by condensing the refrigerant to a liquid within the condenser. The electric machine also includes a nozzle configured to direct a cooling fluid upon the axial end of the rotor for transferring heat from the condenser.

According to some embodiments, an electric machine comprises a stator and a rotor that includes a rotor body configured to rotate about an axis. The rotor defines a plurality of recesses within the rotor, with each of the recesses extending axially outwardly from an inner surface of the rotor. Each of the recesses also define a ledge that extends generally circumferentially and which faces axially outwardly. In some embodiments, one or more of the recesses has a cross-sectional shape of a Christmas tree comprising two or more overlapping triangles.

According to some embodiments, an electric machine comprises a stator and a rotor configured to rotate with a shaft about an axis. At least one of the stator and/or the rotor defines a plurality of cooling channels that extend axially. A fan is attached to an axial end of the shaft and is configured to circulate air through the cooling channels.

According to some embodiments, an electromagnetic machine includes a stator that includes a back plate and a plurality of electrical conductors radially disposed on the back plate. The electromagnetic machine also includes a rotor that includes a body having an outer diameter corresponding to an inner diameter of the stator and at least one magnet having a first end disposed proximate the stator and a second end disposed opposite the first end. The electromagnetic machine also includes an engaging member disposed on a shaft that extends axially relative to the rotor, the engaging member being configured to engage at least one recessed portion of the rotor.

According to some embodiments, an electric machine includes a stator including a core, the core including a yoke having a plurality of teeth extending radially from the yoke, the core defining a slot between two adjacent teeth of the plurality of teeth. The electric machine also includes a first winding of electrically-conductive material extending through the slot adjacent a first tooth of the plurality of teeth and a second winding of electrically-conductive material extending through the slot adjacent a second tooth of the plurality of teeth. The electric machine also includes a cooling channel extending through the slot and configured to convey a coolant fluid for removing heat from the stator.

According to some embodiments, an apparatus includes a stator that includes a back plate and a plurality of electrical conductors radially disposed on the back plate and a rotor configured to rotate relative to the stator and defining an air gap between the rotor and the stator. The rotor includes a body having an outer diameter corresponding to an inner diameter of the stator and of permanent magnets disposed upon the body and adjacent to the air gap. The rotor defines a trough extending circumferentially between adjacent ones of the plurality of permanent magnets, the trough extending radially from the body toward the stator. The apparatus also includes a cooling channel extending through the trough and configured to convey a coolant fluid and an engaging member disposed on a shaft that extends axially relative to the rotor, the engaging member being configured to engage at least one recessed portion of the rotor.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
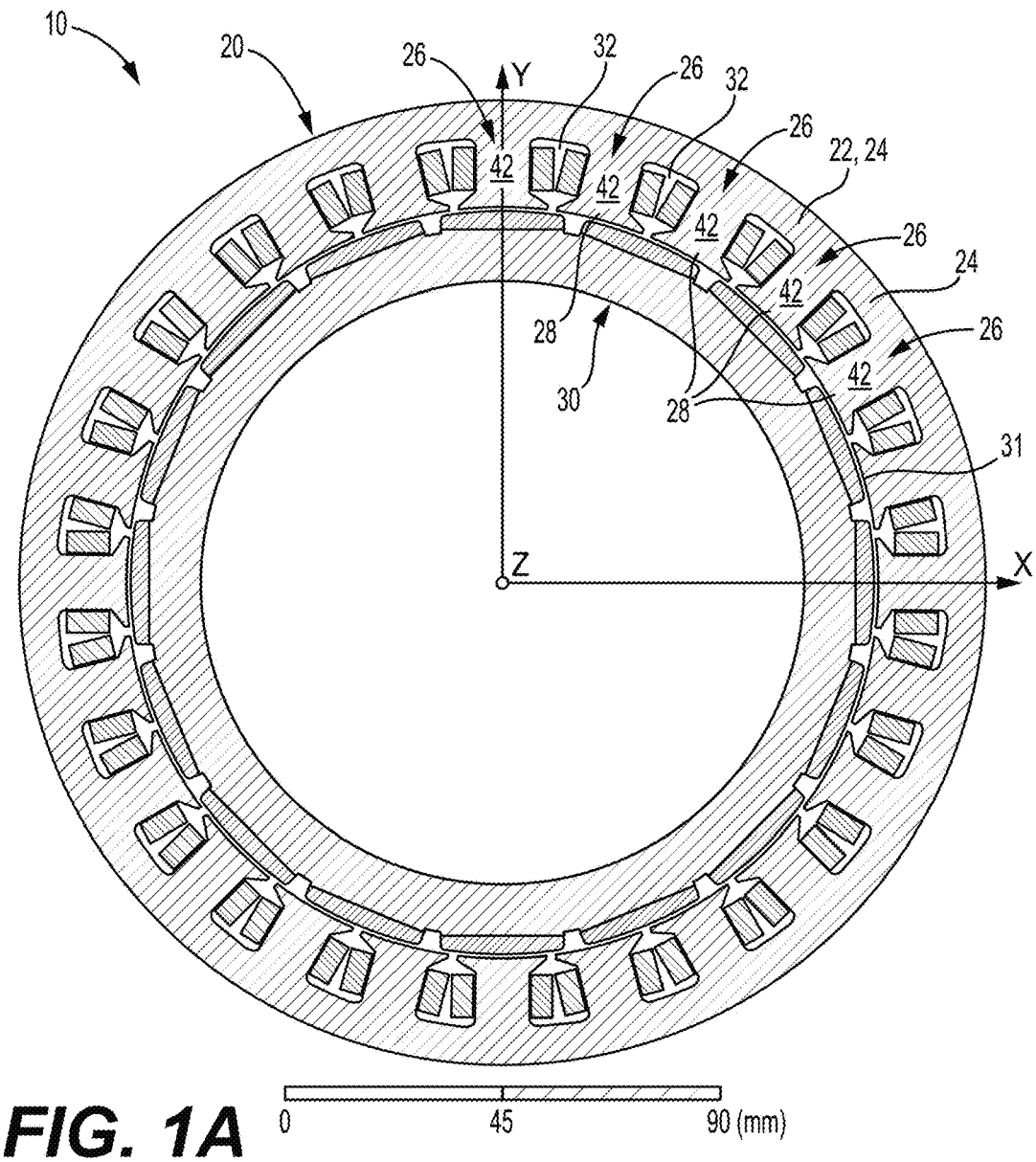
FIG. 1A generally illustrates a cross-sectional view of an electric machine according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, typical electromagnetic machines comprising permanent magnets may be relatively expensive to manufacture. Accordingly, electromagnetic machines, such as those described herein, that achieve similar output characteristics, as typical electromagnetic machines, at a lower manufacturing cost, may be desirable.

Further, thermal management, including heat dissipation, is an important design and operating aspect for electric machines, such as motors, generators, or motor/generators. Thermal management is especially important for electric machines used as traction motors in electrified vehicles, such as battery electric vehicles (EVs) and plug-in hybrid electric vehicles (PHEVs). Heat dissipation may be accomplished using a variety of different cooling devices, including passive devices such as heat sinks and active devices that may transfer heat away from the heat source using a moving fluid. Various design considerations affect the type of cooling device or devices that may be employed. Some primary design considerations include cost, packaging constraints, and environmental conditions.

According to some embodiments, electromagnetic machines described herein may be configured to deliver similar output characteristics within the similar outer diameter, length, input voltage, current, and thermal limits as typical electromagnetic machines. In some embodiments, the electromagnetic machines described herein may use reduced number of neodymium (NdFeB) permanent magnets.

In some embodiments, the electromagnetic machines described herein may provide an increased reluctance torque component. In some embodiments, the electromagnetic machines described herein may include minimum end winding length (e.g., due to concentrated winding, as will be described).

In some embodiments, the electromagnetic machines described herein may include a peak-peak torque ripple value less than 1% of a motor peak torque. In some embodiments, the electromagnetic machines described herein may include minimum back iron in the rotor and stator, which may reduce an amount of electrical steel used in the rotor and stator.

In some embodiments, the electromagnetic machines described herein may include an engaging member having a gear-like structure and comprising aluminum or other suitable material. The engagement member may be disposed on a shaft and may be configured to engage the rotor to connect the rotor to the shaft.

In some embodiments, the electromagnetic machines described herein may reduce magnet losses through axial magnet segmentation and/or radial magnet segmentation. In some embodiments, the electromagnetic machines described herein may include a flux focusing arrangement in the rotor, which may result in an increased flux linkage with the stator. In some embodiments, the electromagnetic machines described herein may include an arrangement to hold magnets in the rotor from moving upwards without additional retaining structure.

FIG. 1A is cross-sectional view of an electric machine 10 according to embodiments of the disclosure. Specifically, the electric machine 10 includes a stator 20 which comprises a core 22. In some embodiments, the core 22 is made from a stack of laminations of material. The core 22 may be made of steel, such as silicon steel, to provide a relatively low reluctance. The core 22 includes a yoke 24 having a ring-shaped cross-section, as shown in FIG. 1A. The core 22 also includes a plurality of teeth 26 that extend radially from the yoke 24. The teeth 26 each extend between the yoke 24 and a distal end 28 that is radially spaced apart from the yoke 24. The electric machine 10 also includes a rotor 30 that is configured to rotate, and which defines an air gap 31 between the rotor 30 and the stator 20. The core 22 of the stator 20 also defines slots 32 between adjacent ones of the teeth 26.

In some embodiments, and as shown in FIG. 1A, the electric machine 10 is configured as an internal rotor machine, and the teeth 26 extend radially inwardly toward the rotor 30. In other embodiments (not shown in the FIGS), the teeth 26 extend radially outwardly toward an external rotor that may surround the stator 20.

Figure 1B:
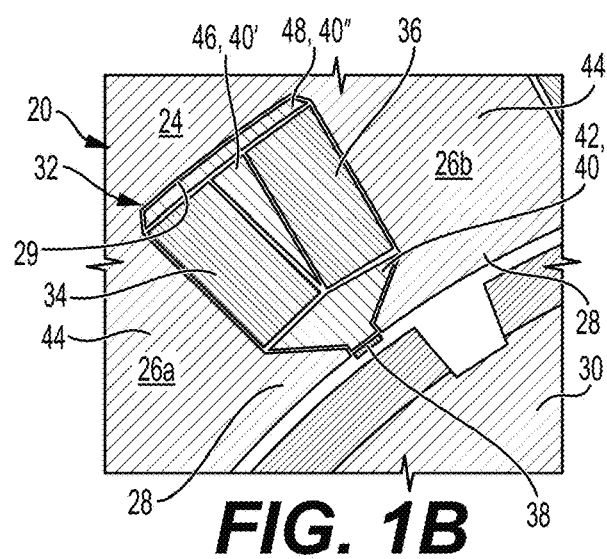
FIG. 1B generally illustrates an enlarged section of the cross-sectional view of FIG. 1A showing a stator with fluid channels according to the principles of the present disclosure.

FIG. 1B is an enlarged section of the cross-sectional view of FIG. 1A, including a first tooth 26a and a second tooth 26b, where each of the first and second teeth 26a, 26b are ones of the teeth 26 which are adjacent to one another. FIG. 1B shows one of the slots 32 between the first tooth 26a and the second tooth 26b. FIG. 1B also shows a first winding 34 of electrically-conductive material extending through the slot 32 adjacent to the first tooth 26a, and a second winding 36 of electrically-conductive material extending through the slot 32 adjacent to the second tooth 26b. The windings 34, 36 may be made of copper or a copper alloy, although other materials may be used to form the windings. The windings 34, 36 may take the form of a wire that is wound around one or more of the teeth 26. Alternatively, the windings 34, 36 may take the form of one or more bars or rods.

As also shown in FIG. 1B, a cooling channel 40, 40', 40" may extend through the slot 32 to convey a coolant fluid for directly removing heat from the stator 20. In some embodiments, each of the slots 32 may define an upper cavity 42 that extends through the slot 32 between the distal ends 28 of the teeth 26a, 26b and on a side of the first winding 34 and the second winding 36 that is radially adjacent to the rotor 30. The cooling channel 40, 40', 40" may take the form of a first cooling channel 40 that extends through the upper cavity 42.

In some embodiments, and as also shown in FIGS. 1A and 1B, each of the teeth 26a, 26b may include a trunk 44 with a generally rectangular cross-section extending radially from the yoke 24 to the distal end 28. The first winding 34 and the second winding 36 together define a wedge-shaped space 46 therebetween and within the slot 32. The cooling channel 40, 40', 40" may take the form of a second cooling channel 40' that extends through the wedge-shaped space 46 between the first and second windings 34, 36. Alternatively or additionally, the slot 32 may include a bottom cavity 48 that extends along a floor 29 of the slot 32 adjacent the yoke 24. The bottom cavity 48 that extends radially away from floor 29 to one of the first winding 34 and/or the second winding 36. The cooling channel 40, 40', 40" may take the form of a third cooling channel 40" that extends through the bottom cavity 48.

In some embodiments, the cooling channel 40, 40', 40" may comprise one or more of the first, second, and/or the third cooling channels 40, 40', 40". Furthermore, the cooling channel 40, 40', 40" may include a conduit, such as a tube of liquid-tight material. Such a tube of liquid-tight material may include, for example, plastic, rubber, or a composite material. In some embodiments, one or more portions of the cooling channels 40, 40', 40" may be defined entirely or in part by the core 22 and/or one of the windings 34, 36 of the stator 20. In some embodiments, a first seal 38 of liquid-tight material may define some or all of the cooling channel 40, 40', 40". For example, and as shown in FIG. 1B, the first seal 38 may extend between the distal ends 28 of adjacent ones of the teeth 26a, 26b in order to enclose the slot 32 and to prevent coolant fluid from migrating out of the slot 32.

Figure 1C:
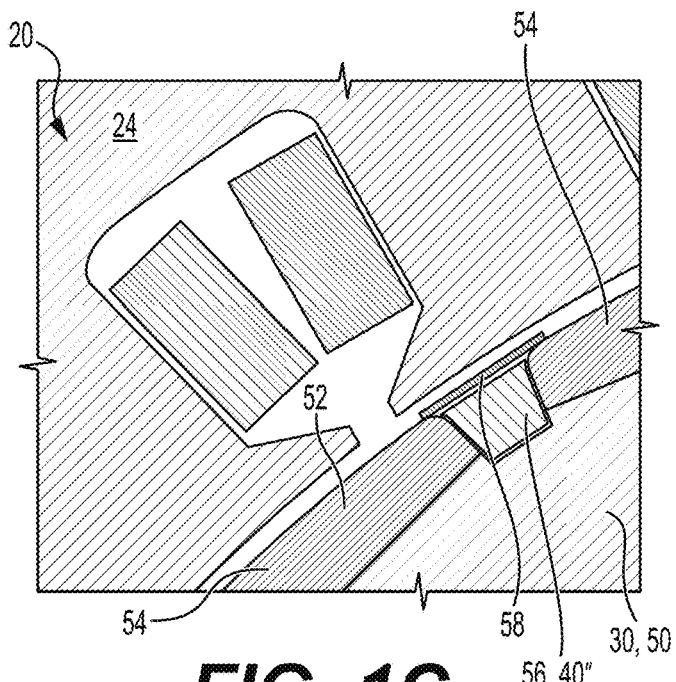
FIG. 1C generally illustrates an enlarged section of the cross-sectional view of FIG. 1A showing a rotor with a fluid channel according to the principles of the present disclosure.

FIG. 1C is an enlarged section of the cross-sectional view of FIG. 1A showing the rotor 30 with a fourth fluid channel 40''' according to an aspect of the disclosure. Specifically, the rotor 30 includes a body 50 defining a peripheral edge 52 facing the stator 20. The rotor also includes a plurality of permanent magnets 54 disposed upon the body 50 and about the peripheral edge 52 of the rotor 30 and adjacent to the air gap 31. The rotor 30 defines a trough 56 that extends circumferentially between and abutting adjacent ones of the permanent magnets 54, and without any portion of the body 50 of the rotor 30 extending therebetween. The trough 56 extends radially from the body 50 toward the stator 20. A fourth cooling channel 40''' may extend through the trough 56 in the rotor 30 to convey a coolant fluid therethrough for directly cooling the rotor 30. In some embodiments, some or all of the permanent magnets 54 may be inset within the body 50 of the rotor 30. In the example embodiment of FIGS. 1A-1C, the electric machine 10 is configured as an internal rotor machine, with the permanent magnets 54 mounted on a radially outside surface of the rotor 30. In other embodiments (not shown in the FIGS), the permanent magnets 54 may extend radially inwardly toward an internal stator that is encircled by the rotor 30. In some embodiments, the fourth fluid channel 40''' includes a conduit of a material having a high reluctance, such as, for example plastic or composite material. Such material may provide advantages over materials having a lower reluctance, such as metals. For example, a conduit having a relatively high reluctance may cause more of the magnetic flux from the permanent magnets to be directed radially outwardly or inwardly, which can provide improved performance of the electric machine 10.

In some embodiments, a second seal 58 of liquid-tight material may define some or all of the trough 56. For example, and as shown in FIG. 1C, the second seal 58 may extend between adjacent ones of the permanent magnets 54 in order to enclose the trough 56 and to prevent coolant fluid from migrating out of the trough 56.

The coolant fluid that is circulated through the cooling channels 40, 40', 40'', 40''' may include a refrigerant configured to remove heat through a phase change. Alternatively or additionally, the coolant fluid may include a coolant liquid such as, for example, water, methanol, glycol, or a mixture of two or more different coolant liquids.

Figure 3:
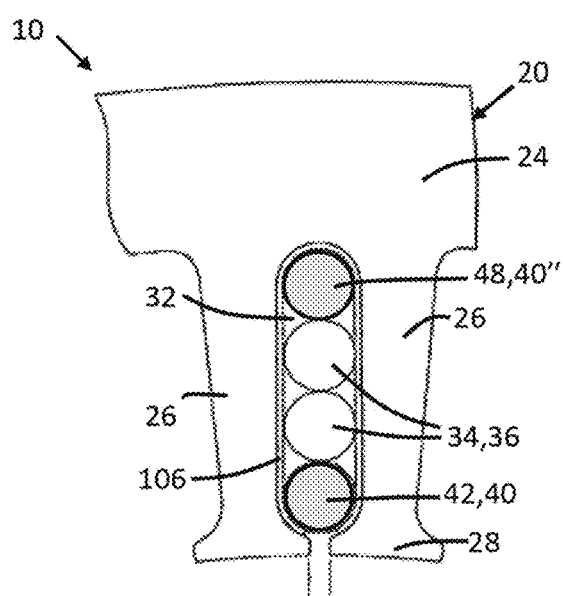
FIG. 3 generally illustrates a partial cross-sectional view of the stator of FIG. 2 according to the principles of the present disclosure.
Figure 2:
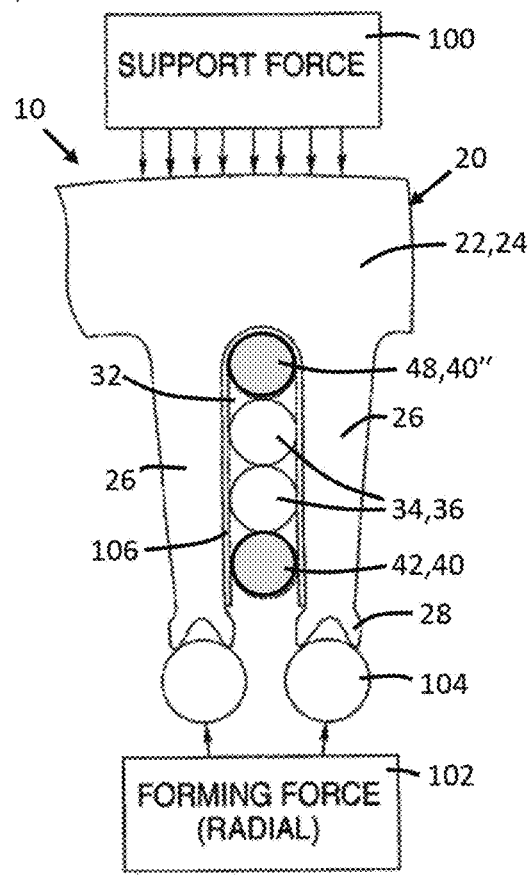
FIG. 2 generally illustrates a partial cross-sectional view of a stator of an electric machine according to the principles of the present disclosure.

FIGS. 2-3 are partial cross-sectional views of a stator 20 according to aspects of the disclosure. The stator 20 shown in FIGS. 2-3 may have a similar construction to the stator 20 of FIGS. 1A-1C, with a core 22 that includes a yoke 24 and a plurality of teeth 26 extending radially inwardly from the yoke 24. The core 22 may be formed, for example, from laminated steel. Specifically, FIGS. 2-3 show two adjacent teeth 26 the stator 20, with each of the teeth 26 having an elongated trapezoidal shape extending radially inwardly from a yoke 24. A slot 32 having parallel sides is defined between the two adjacent teeth 26 the stator 20 with windings 34, 36 extending through the slot 32. FIGS. 2-3 show an apparatus for forming the teeth 26 by compressing the teeth 26 between a support force 100 that acts radially upon the yoke 24 and a forming force 102 that acts radially upon the teeth 26. The support force 100 and the forming force 102 act in opposite directions to compress and deform the teeth 26 to enclose the slot 32. Specifically, the forming force 102 acts upon a die 104 to deform and spread the distal ends 28 of the teeth 26. A spacer 106 lines an inner surface of the slot 32 to prevent the windings 34, 36 from contacting the core 22 of the stator 20.

As also shown in FIGS. 2-3, a first cooling channel 40 extends through an upper cavity 42 in the slot 32 between the distal ends 28 of the teeth 26. A third cooling channel 40'' extends through a bottom cavity 48 in the slot 32 along the yoke 24 and radially away from the yoke 24 to one of the windings 34, 36. The electric machine 10 may include one or more of the cooling channels disclosed. The cooling channel or channels 40, 40', 40'' may be configured differently than as shown. For example, a cooling channel 40, 40', 40'' may be disposed between the windings 34, 36.

Figure 4:
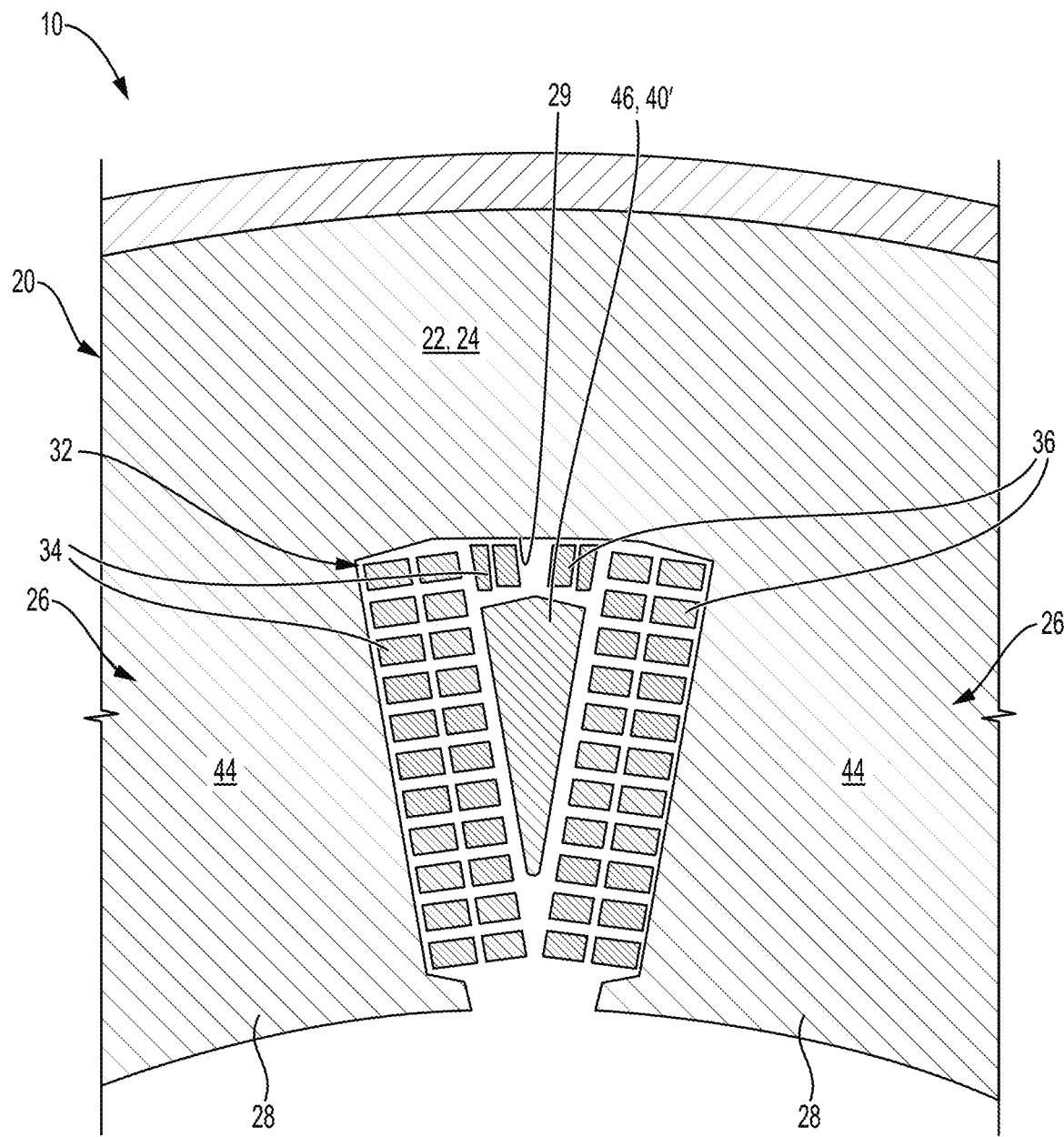
FIG. 4 generally illustrates a partial cross-sectional view of a stator of an electric machine according to the principles of the present disclosure.

FIG. 4 is a partial cross-sectional view of a stator of an electric machine according to aspects of the disclosure. Specifically, FIG. 4 is a variation of the stator 20 shown in FIG. 1B, in which the first winding 34 and the second winding 36 together define a wedge-shaped space 46 therebetween and within the slot 32. Similarly to the arrangement of FIG. 1B, the cooling channel 40, 40', 40'' in FIG. 4 takes the form of a second cooling channel 40' that extends through the wedge-shaped space 46 between the first and second windings 34, 36. In FIG. 4, a portion of each of the windings 34, 36 extends along the floor 29 of the slot 32 to surround the wedge-shaped space 46.

Figure 5:
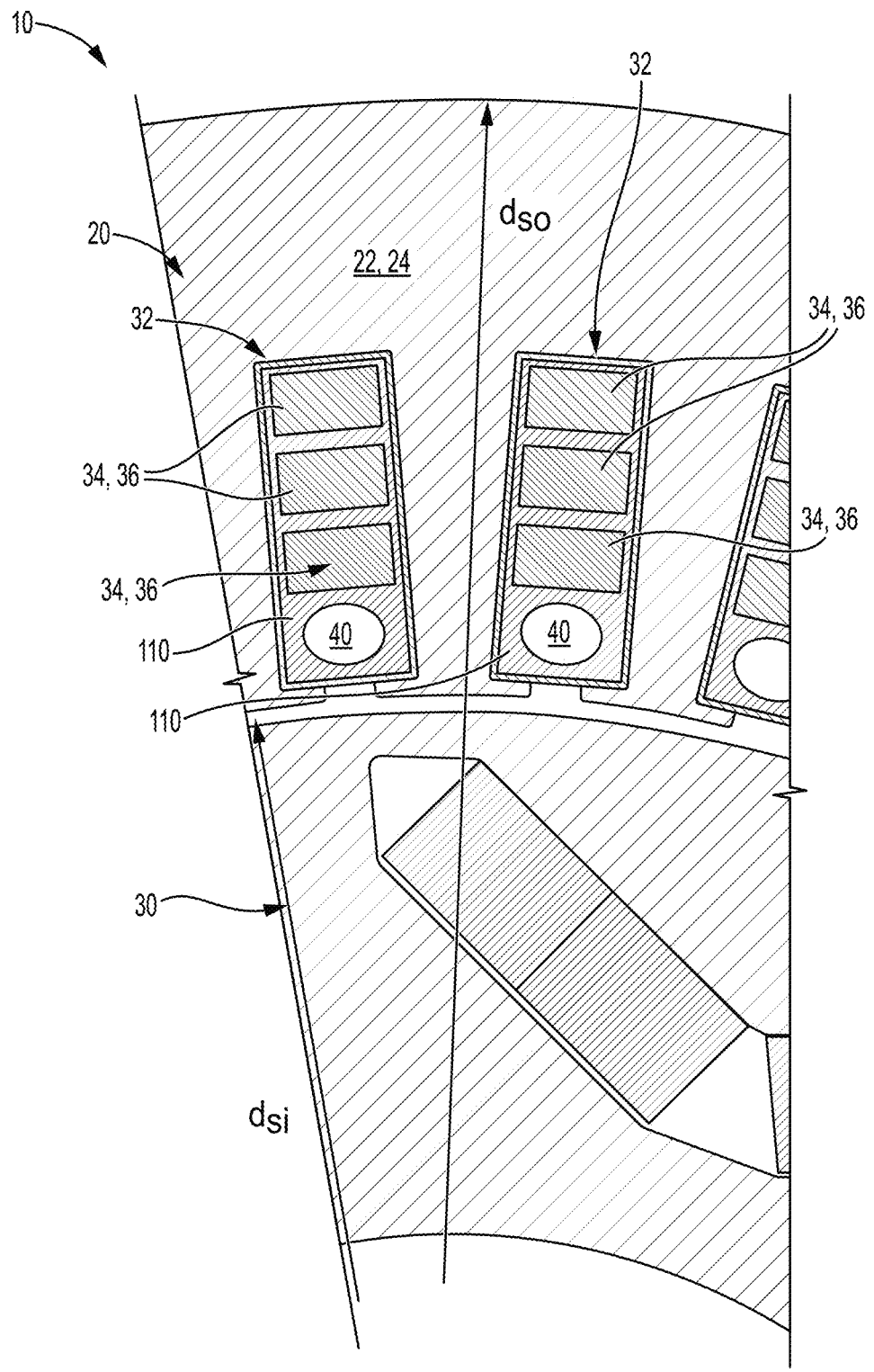
FIG. 5 generally illustrates a partial cross-sectional view of an electric machine according to the principles of the present disclosure.

FIG. 5 is a partial cross-sectional view of an electric machine according to aspects of the disclosure. In some embodiments, and as shown in FIG. 5, the stator 20 of an electric machine 10 includes a potting material 110 that envelopes the windings 34, 36. The potting material 110 may hold the windings 34, 36 and prevent the windings 34, 36 from moving relative to the core 22 of the stator 20. The potting material 110 may be, for example, a non-conductive epoxy, resin, and/or plastic material. In some embodiments, and as shown in FIG. 5, a cooling channel 40 extends through the potting material 110 within the slots 32 for conveying a coolant fluid therethrough to remove heat from the stator 20. FIG. 5 shows one example arrangement of the cooling channels 40. However, each slot may have one or more cooling channels 40 that may extend through a corresponding one of the slots 32 in any suitable location. For example, the cooling channels 40 may be disposed adjacent to the rotor 30, as shown. Alternatively or additionally, the cooling channels 40 may be disposed adjacent to the yoke 24 of the stator 20 and/or within or amongst the windings 34, 36.

Figure 6:
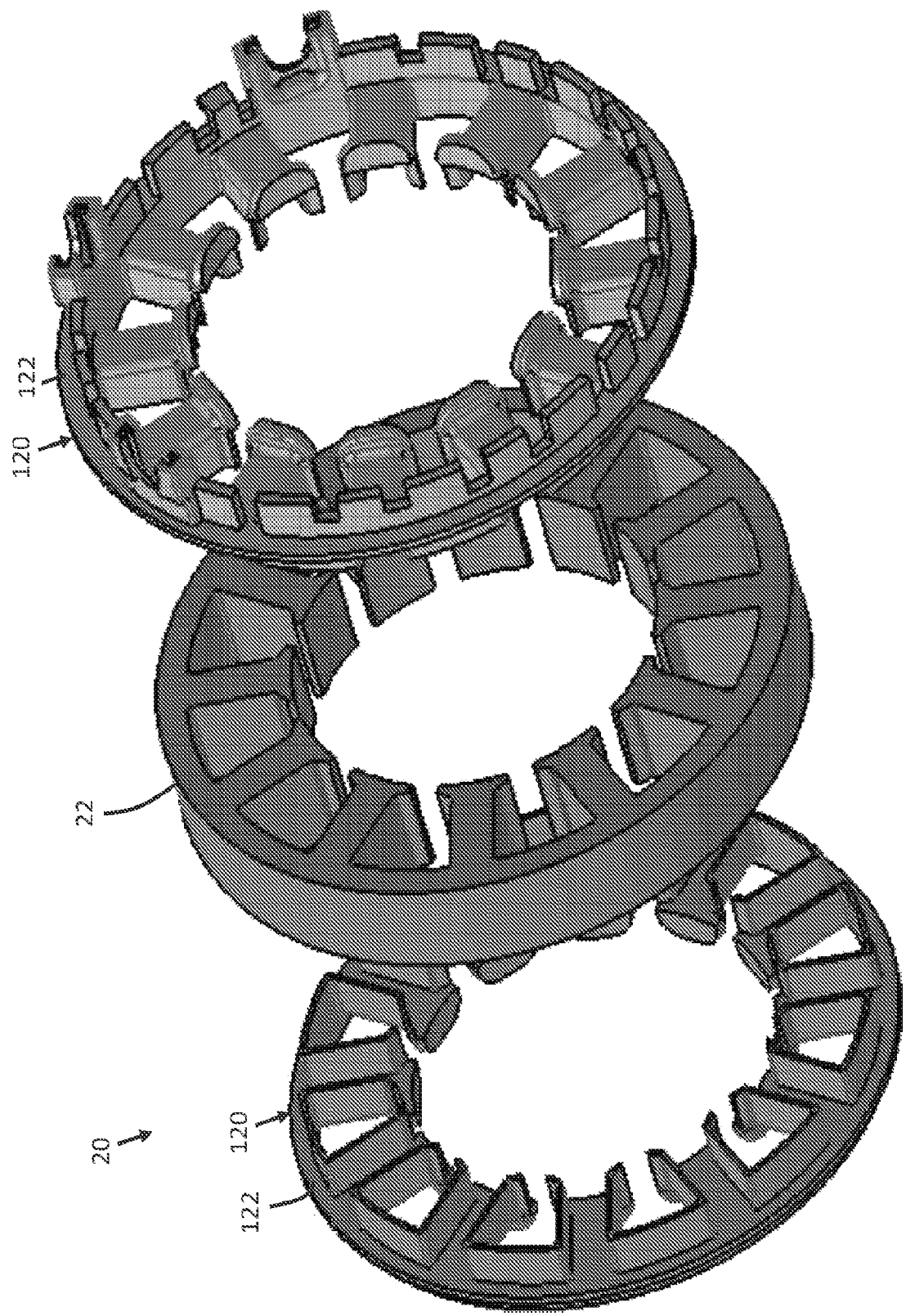
FIG. 6 generally illustrates an exploded view of parts of a stator according to the principles of the present disclosure.

FIG. 6 is an exploded view of parts of a stator 20 according to aspects of the disclosure. Specifically, the stator 20 includes a core 22, which may be formed of steel. A coil carrier 120 surrounds the core 22 to hold one or more winding coils and to prevent the winding coils from directly contacting the core 22. In some embodiments, and as shown in FIG. 6, the coil carrier 120 includes a first carrier shell 122 and a second carrier shell 124 that together surround the core 22 of the stator 20. The carrier shells 122, 124 may surround the core 22 of the stator 20 in a clamshell arrangement.

Figure 7:
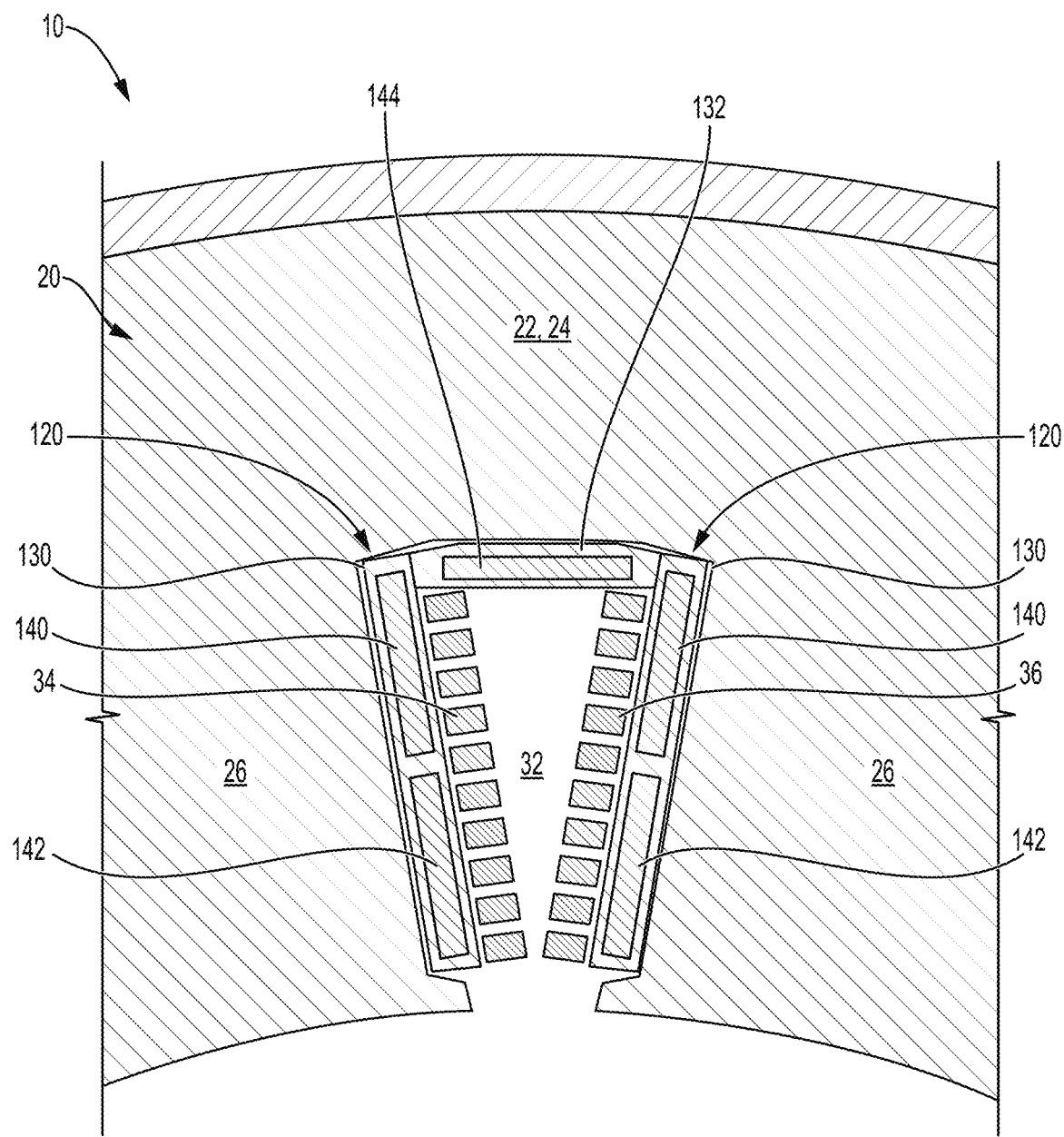
FIG. 7 generally illustrates a partial cross-sectional view of a stator within an electric machine according to the principles of the present disclosure.

FIG. 7 is a partial cross-sectional view of a stator 20 within an electric machine 10 according to aspects of the disclosure. Specifically, the stator 20 includes a core 22, which may be formed, for example, of steel. The core 22 includes a yoke 24 having an annular cross-section and a plurality of teeth 26 extending radially from the yoke 24. Adjacent ones of the teeth 26 define a slot 32 therebetween. A set of windings 34, 36 of electrically-conductive material extends through the slot 32. The windings 34, 36 may be, for example, metal wire or bars. The windings 34, 36 may be made of copper with a coating of an electrically insulating material. The coil carrier 120 includes a wall portion 130 that extends through the slot 32 and adjacent one of the teeth 26. The coil carrier 120 may be made of electrically nonconductive material in order to hold the windings 34, 36 apart from the teeth 26 of the core 22. Alternatively or additionally, the coil carrier 120 may include a floor portion 132 that extends through the slot 32 and adjacent the yoke 24 of the core 22.

The wall portions 130 of the coil carrier 120 each define a first cooling channel 140 and a second cooling channel 142. The floor portion 132 of the coil carrier 120 defines a third cooling channel 144. Each of the cooling channels 140, 142, 144 is configured to convey a coolant fluid for removing heat from the stator 20. The diagram of FIG. 7 is merely an example arrangement, and the coil carrier 120 may include any configuration of the cooling channels 140, 142, 144 including any one or more of the cooling channels 140, 142, 144 shown. For example, the wall portions and/or the floor portions 132 may each include any number of the cooling channels 140, 142, 144. In some embodiments, other portions of the coil carrier 120, such as portions of the first and second carrier shells 122, 124 that extend outside of the slots 32 may also define fluid conduits for conveying coolant fluid. Those fluid conduits may, for example, serve as headers for directing fluid into and out of the cooling channels 140, 142 in the wall portions 130 of the coil carrier 120.

Figure 8:
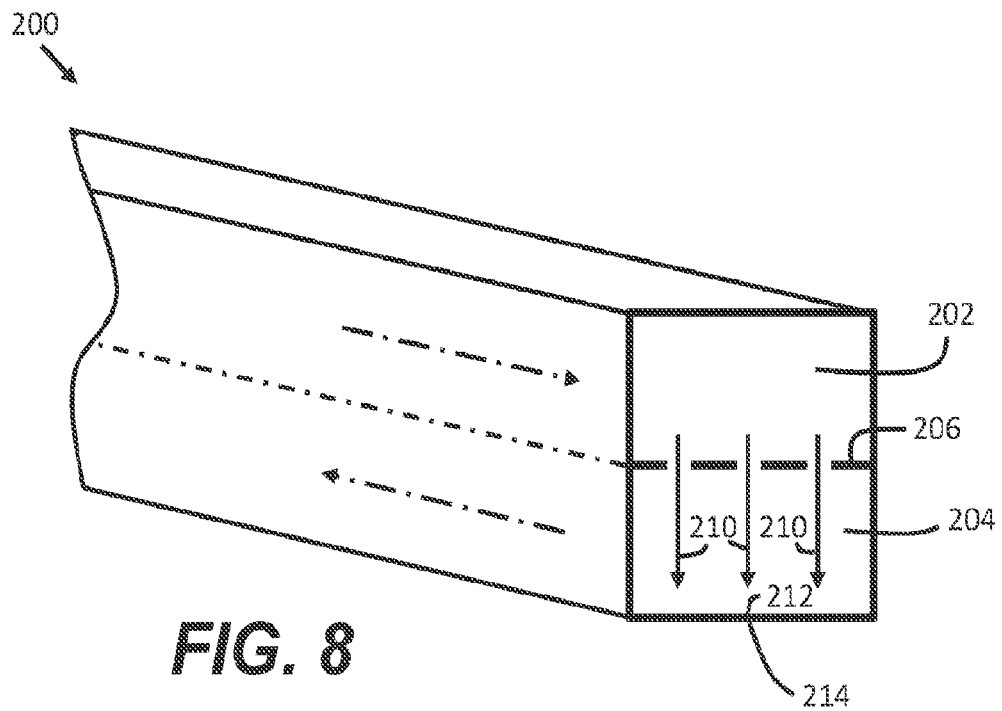
FIG. 8 generally illustrates a perspective schematic view of a cooling channel according to the principles of the present disclosure.
Figure 9:
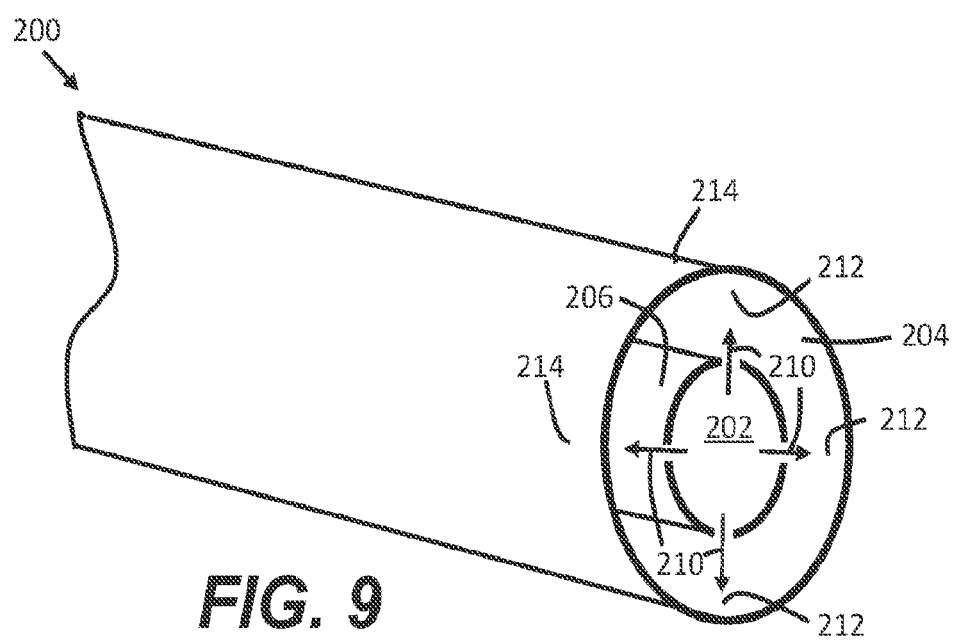
FIG. 9 generally illustrates a perspective schematic view of a cooling channel according to the principles of the present disclosure.

In some embodiments, one or more of the cooling channels 40, 40', 40", 40'" 140, 142, 144 within the electric machine 10 may be configured as circulating cooling channels 200 having both a supply conduit 202 and a return conduit 204 and configured to convey coolant fluid through the supply conduit 202 and back from the return conduit 204. In some embodiments, the circulating cooling channel 200 includes the supply conduit 202 and the return conduit 204 adjacent and parallel to one another, with a partition 206 separating the supply conduit 202 from the return conduit 204. In some embodiments, and as shown in FIGS. 8-9, the partition 206 defines one or more passages 208 for conveying the fluid from the supply conduit 202 into the return conduit 204 in the form of one or more fluid jets 210. The fluid jets 210, which may also be called impinging jets, contact a target surface 212, which may be a predetermined region within the return conduit 204. The fluid jets 201 thus remove heat from an outside surface 214 of the circulating cooling channel 200, and particularly where the outside surface 214 is adjacent and opposite to the target surface 212. This configuration may be especially useful where the outside surface 214 is in direct thermal communication with a heat source, such as a winding or where the outside surface 214 is in direct thermal communication with a component that is sensitive to temperature, and which can most benefit from having a regulated temperature. For example, the outside surface 214 may be placed in thermal communication with a permanent magnet in order to maintain the permanent magnet within a predetermined temperature range, even when other portions of the electric machine 10 have a higher temperature.

FIG. 8 shows an example embodiment of a circulating cooling channel 200 having the supply and return conduits 202, 204 extending parallel and adjacent to one another. FIG. 9 shows another example embodiment of a circulating cooling channel 200 in which the supply conduit 202 and the return conduit 204 are coaxial, with the supply conduit 202 disposed within the return conduit 204, and with the partition 206 having a closed cross-section to define the return conduit 204 as a central region bounded by the partition 206.

In some embodiments, one or more cooling channels 40, 40', 40", 40'" 140, 142, 144 within the electric machine 10 may be configured as counter-flowing cooling channels 220 having two or more streams 222, 224 of coolant fluid that are configured to converge from opposite directions at a convergence region 226 to generate a turbulence within the coolant fluid.

The turbulence may enhance cooling by increasing the effectiveness of the coolant fluid to remove heat from the one or more cooling channels 40, 40', 40", 40'" 140, 142, 144. For example, turbulence may cause a convection cooling effect in which more heat is transferred to the cooling fluid from an interior wall of the one or more cooling channels 40, 40', 40", 40'" 140, 142, 144 than would be transferred as a result of a less turbulent (e.g. laminar) flow.

Figure 10:
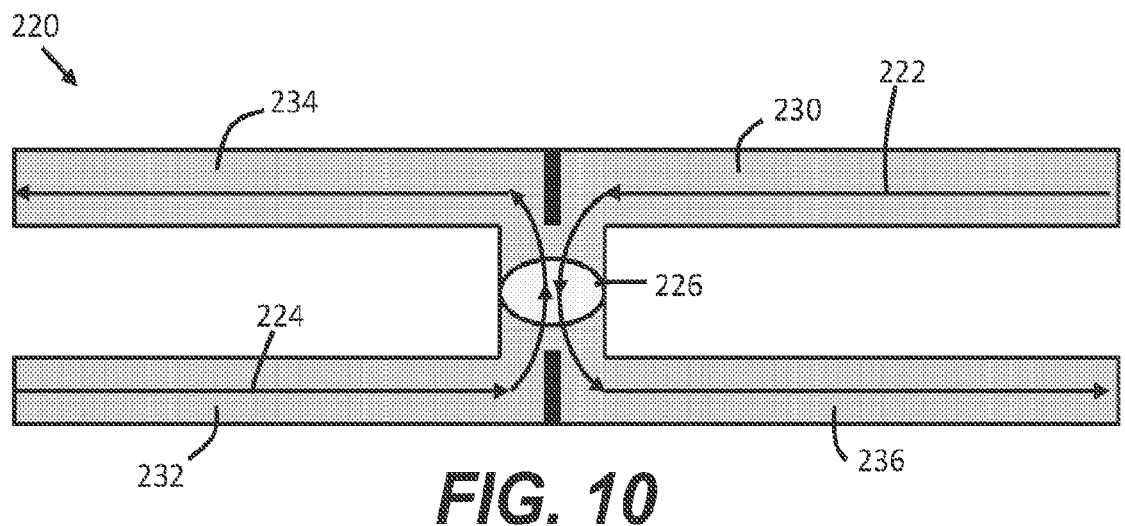
FIG. 10 generally illustrates a schematic diagram of a cooling channel according to the principles of the present disclosure.

FIG. 10 shows one example configuration of a counter-flowing cooling channel 220 having a first supply line 230 configured to convey the first stream 222 of the coolant fluid to the convergence region 226. The counter-flowing cooling channel 220 of FIG. 10 also has a second supply line 232 configured to convey the second stream 224 of the coolant fluid to the convergence region 226, where the two streams 222, 224 meet from opposite directions to generate turbulent flow. The example counter-flowing cooling channel 220 of FIG. 10 also includes a first return line 234 and a second return line 236 for conveying the coolant fluid from the convergence region 226. In some embodiments, and as shown in the example configuration of FIG. 10, one or more blocks 238 or other structures may be provided to direct the coolant fluid into the convergence region 226 and to interrupt a direct path between one of the supply lines 230, 232 and a corresponding one of the return lines 234, 236.

Figure 11:
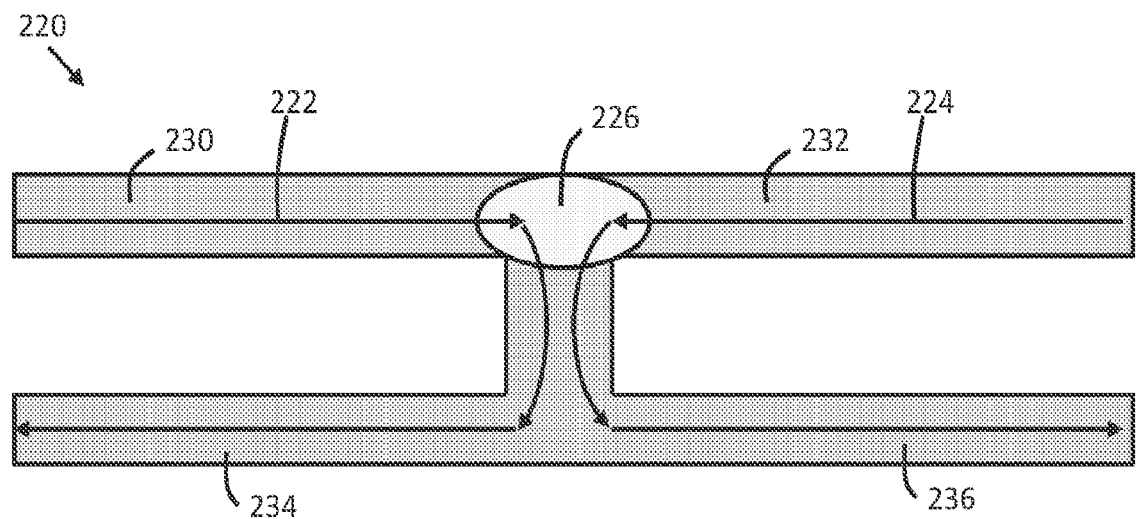
FIG. 11 generally illustrates a schematic diagram of a cooling channel according to the principles of the present disclosure.

FIG. 11 shows another example configuration of a counter-flowing cooling channel 220 having the first and second supply lines 230, 232 each configured to convey a corresponding one of the streams 222, 224 of the coolant fluid to the convergence region 226. Specifically, the example configuration of FIG. 11 includes the first stream 222 and the second stream 224 converging head-on (i.e. 180 degrees to one-another) at the convergence region 226. The example configuration of FIG. 11 also includes a pair of return lines 234, 236 configured to remove the coolant fluid from the convergence region 226. In some embodiments, the streams 222, 224 may converge at a right angle or at an oblique angle to one-another.

The example embodiments of FIGS. 10-11 each include two supply lines 230, 232 and two return lines 234, 236. However, a counter-flowing cooling channel 220 may have any number of two or more supply lines 230, 232 and any number of return lines 234, 236. For example, in some embodiments, the counter-flowing cooling channel 220 may include three or more of the supply lines 230, 232 each configured to convey a corresponding one of the streams 222, 224 of the coolant fluid to the convergence region 226.

Figure 12:
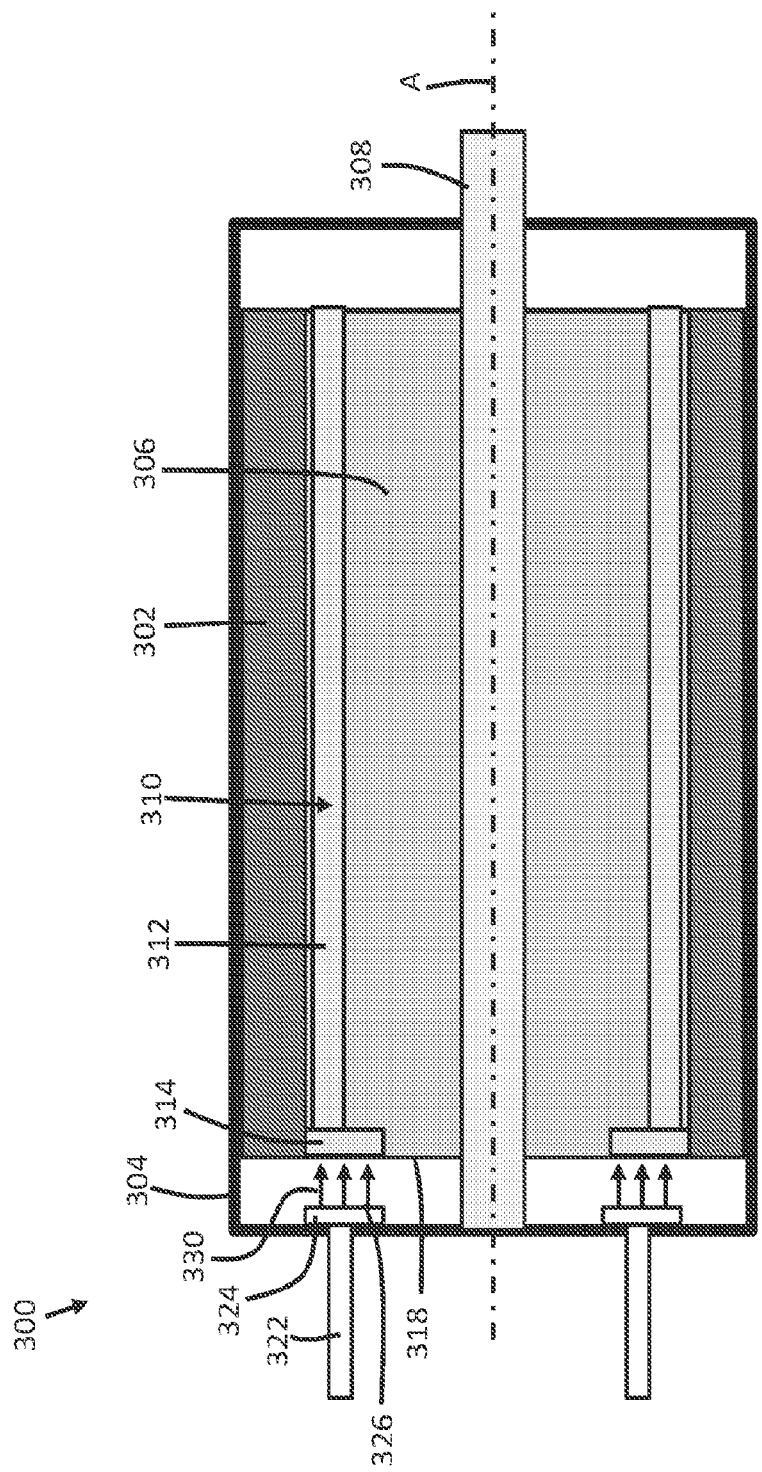
FIG. 12 generally illustrates cross-sectional view of an electric machine including a heat pipe within a rotor according to the principles of the present disclosure.

FIG. 12 is cross-sectional view of an electric machine 300 including a heat pipe 310 within a rotor 306 according to embodiments of the disclosure. Specifically, the electric machine 300 includes a stator 302 disposed within a housing 304 and a rotor 306 configured to rotate about an axis A and to turn an output shaft 308. The rotor 306 includes a heat pipe 310 configured to remove heat from the rotor 306. The heat pipe 310 includes an evaporator tube 314 extending axially through the rotor 306. The heat pipe 310 also includes a condenser 316 disposed at or adjacent to an axial end 318 of the rotor 306. The heat pipe 310 is configured to absorb heat from the rotor 306 by evaporating a refrigerant within the evaporator tube 314 and to transfer the heat away from the rotor 306 by condensing the refrigerant to a liquid within the condenser 316.

As also shown in FIG. 10, the electric machine 300 includes a supply line 322 in fluid communication with a header 324 within the housing 304 and configured to deliver a cooling fluid into the header 324. The header 324 includes one or more nozzles 326, which are each configured to direct one or more streams 330 of the cooling fluid upon the axial end 318 of the rotor 306 for transferring heat from the condenser 316. The cooling fluid used within the electric machine 300 of FIG. 12 may be an oil. Other types of cooling fluids may be used, such as, for example, methanol or glycol. The electric machine 300 may include any number of the heat pipes 310, and any number of the nozzles 326. The nozzles 326 and/or the headers 324 may be formed directly into the housing 304 and/or the supply lines 322. The electric machine 300 may also include a drain or a return line (not shown) for collecting the cooling fluid within the housing 304. Other equipment, such as a reservoir and a pump for circulating the cooling fluid may also be included.

In some embodiments, the evaporator tube of the 314 of the heat pipe 310 may carry a coolant fluid such as water, methanol, and/or glycol instead of a refrigerant. The condenser 316 may function as a heat exchanger to transfer heat from the coolant fluid within the heat pipe 310 to a cooling fluid, such an oil, that is sprayed thereupon by the nozzles 326.

Figure 13A:
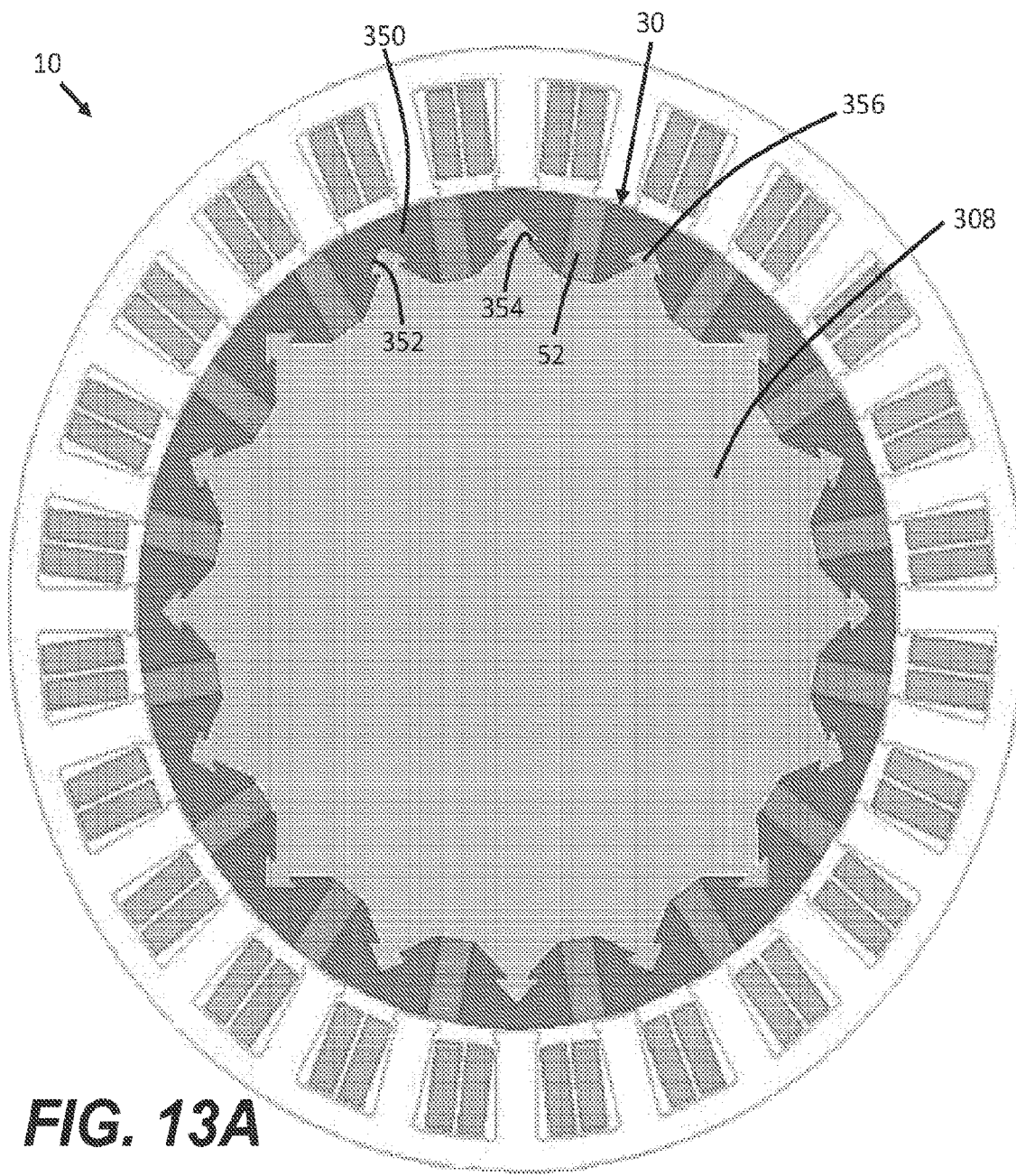
FIG. 13A generally illustrates a cross-sectional view of an electric machine according to the principles of the present disclosure.
Figure 13B:
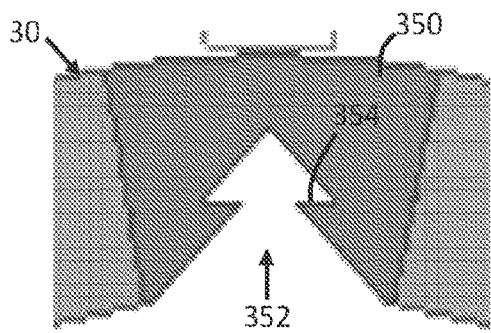
FIG. 13B generally illustrates an enlarged section of FIG. 13A.

FIGS. 13A-13B show a cross-sectional view of an electric machine 10 according to embodiments of the disclosure. Specifically the electric machine 10 includes a rotor 30 having a rotor body 350. The rotor body 350 may be made of steel, such as silicon steel, which may be called "electrical steel" to provide a relatively low reluctance. The rotor body 350 holds a plurality of permanent magnets 54 spaced at regular intervals circumferentially. The rotor body 350 also defines recesses 352, with each of the recesses 352 disposed between two of the permanent magnets 52. Each of the recesses 352 extends axially outwardly from an inner surface of the rotor 30. Each of the recesses 352 has a cross-sectional shape of a Christmas-tree comprising two or more overlapping triangles defining ledges 354 that extend generally circumferentially and which face axially outwardly.

Figure 13C:
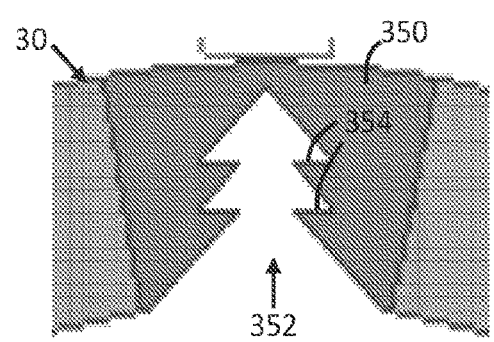
FIG. 13C generally illustrates an alternative version of the cross-sectional generally illustrated in FIG. 13B.

The shaft 308 is disposed within the rotor body 350 with the rotor 30 completely surrounding the shaft 308. The shaft 308 includes a plurality of protrusions 356, with each of the protrusions 356 having a cross-sectional shape that is complementary to all or part of corresponding ones of the recesses 352 of the rotor body 350, causing the rotor body 350 to latch onto the shaft 308. The recesses 352 may extend for an axial length of the generally cylindrical rotor 30 such that they function as internal splines. Similarly, the protrusions 356 may extend for an axial length of the shaft 308 such that they function as external splines. The interaction of the ledges 354 of the rotor body 350 against corresponding portions of the protrusions 356 on the shaft 308 may bias the rotor body 350 inwardly and provide extra strength to the rotor 30. It should be appreciated that the recesses 352 and/or the protrusions 356 may be formed with other cross-sections that may or may not include ledges 354. For example, the recesses 352 may be shaped as a T or a cross (+). FIG. 13C shows a variation of the design of FIG. 13B, where the recess 352 is shaped as three overlapping triangles defining two ledges 354 radially spaced apart from one another.

Figure 14:
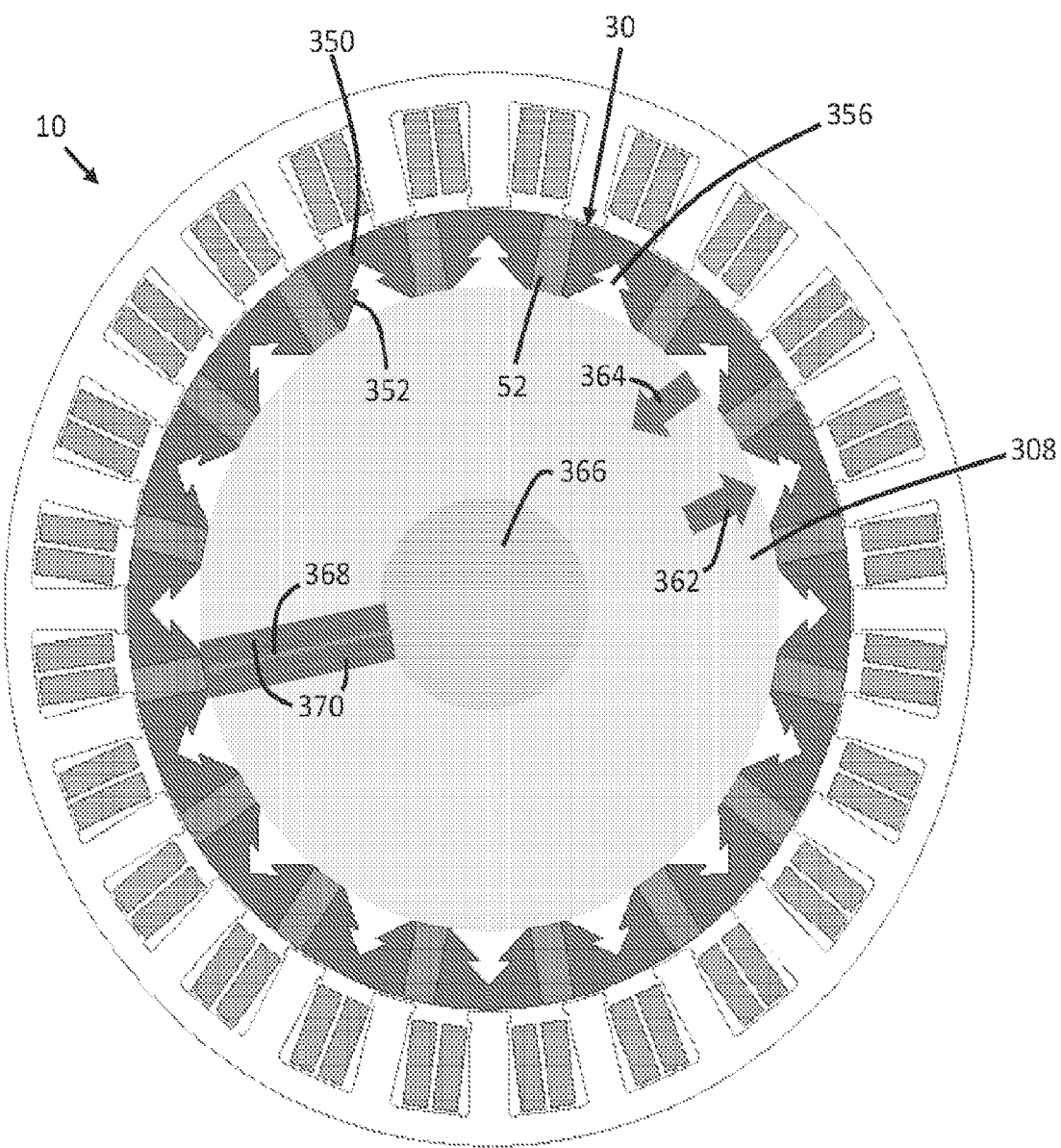
FIG. 14 generally illustrates a cross-sectional view of an electric machine according to the principles of the present disclosure.

FIG. 14 is a cross-sectional view of an electric machine 10 according to embodiments of the disclosure. Specifically, FIG. 14 shows an electric machine 10 with a rotor 30 that is similar or identical to the rotor 30 of FIGS. 13A-13B. The shaft 308 of FIG. 14 is formed as a hollow tube defining a center bore 366 that may be used to convey cooling fluid. For example, one or more second supply channels 368 may convey cooling fluid axially outwardly from the center bore 366. Additionally or alternatively, one or more second return channels 370 may convey cooling fluid axially inwardly toward the center bore 366.

In some embodiments, one or more fluid channels may extend through one or more of the recesses 352 for cooling the rotor 30. The fluid channels may provide for circulation of a cooling fluid such a coolant liquid of gas or refrigerant. The fluid channels may include air space or an evaporator, such as a heat pipe. The one or more fluid channels may be shaped as a rod with a cross-sectional shape that is complementary to all or part of corresponding ones of the recesses 352 of the rotor body 350. In some embodiments, fluid channels may extend through some of the recesses 352, and protrusions 356 of the shaft 308 may extend through other ones of the recesses 352. For example, protrusions 356 of the shaft 308 may extend through every second or every third one the recesses 352, with fluid channels extending through the remaining ones of the recesses 352. Additionally or alternatively, fluid channels may extend through one or more of the protrusions 356 of the shaft 308. In some embodiments, a passive cooling material, such as a solid potting material, may be disposed within one or more of the recesses 352.

In some embodiments, relatively cold coolant, such as automatic transmission fluid (ATF), oil, water, glycol, methanol, or another liquid may pass through one or more first supply channels 360 in the shaft 308 into contact with one or more of the permanent magnets 54 or with a portion of the shaft 308 adjacent to and in thermally conductive contact with one or more of the permanent magnets 54. The coolant may be heated and then flow away from the one or more of the permanent magnets 54 via one or more first return channels 362 in the shaft 308.

In some embodiments, a cooling fluid may be sprayed upon an axial end of the rotor 30, which may convey heat away from one or more of the permanent magnets 54, which may be transferred via thermally conductive material, such as cooling fluid in the recesses 352 of the rotor body 350.

In some embodiments, a fan may be attached to an axial end of the shaft 308 that is configured to circulate air through the rotor 30. For example, the fan may pull air through one or more of the recesses 352 of the rotor body 350 and expel the air radially outwardly. The fan may be shaped as a disc that may include one or more axial blades configured to direct the air axially outwardly as the fan is rotated with the shaft 308.

Figure 15:
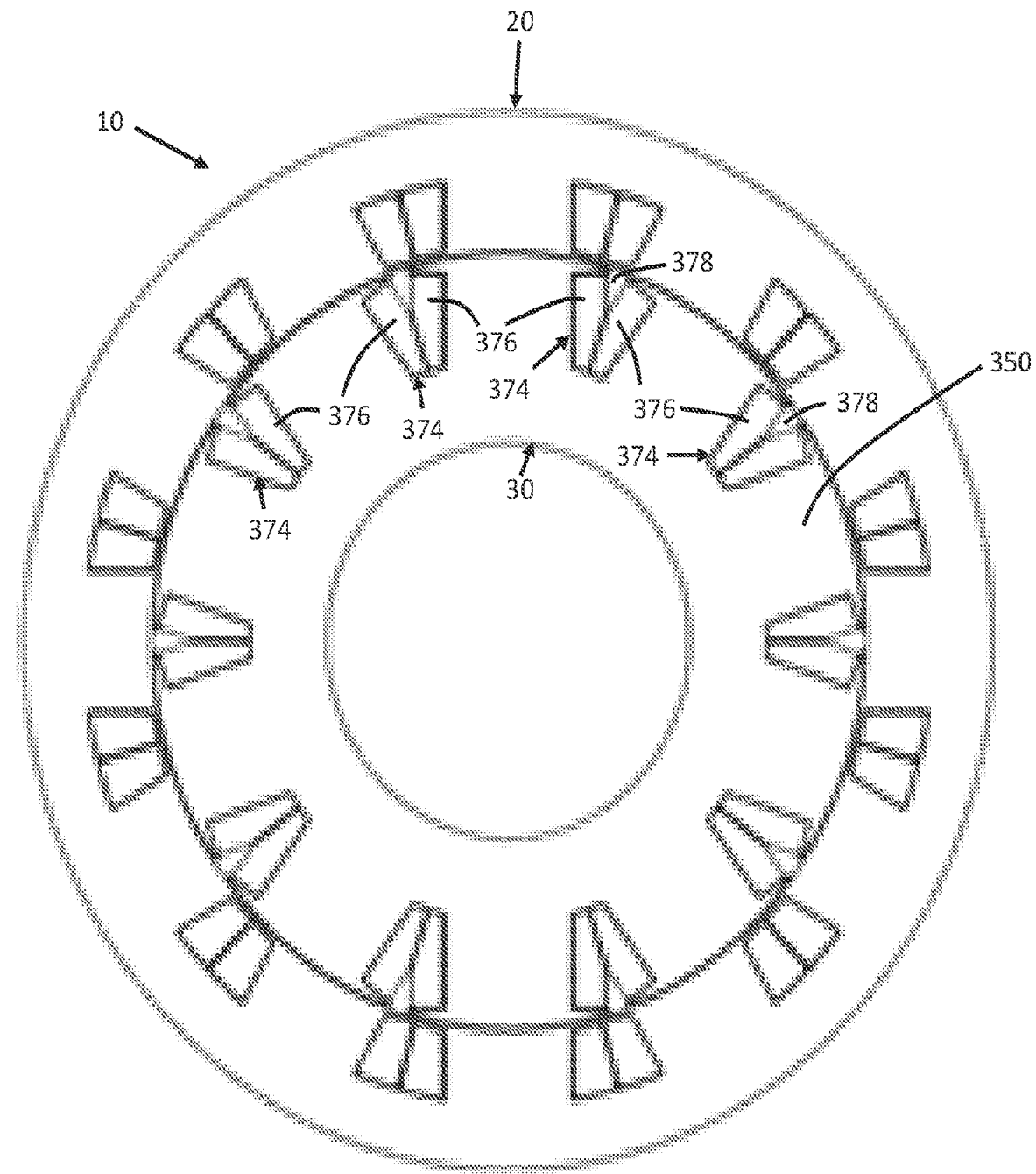
FIG. 15 generally illustrates a cross-sectional view of an electric machine according to the principles of the present disclosure.

One or more of the techniques described in the present disclosure may be applied to an electric machine 10 with a wound rotor, such as a wound field synchronous machine with copper windings in the rotor 30. FIG. 15 is a cross-sectional view of an electric machine 10 according to embodiments of the disclosure. Specifically, the stator 20 of the electric machine 10 includes a rotor body 350 that defines a plurality of rotor slots 376, with each of the rotor slots 374 holding two rotor windings 376. A rotor gap 378 extends between two rotor windings 376. The rotor gap 378 may result from manufacturing limitations in winding and/or inserting the rotor windings 376 into the rotor slots 374. Hence, this rotor gap 378 could be used for one or more of the cooling techniques discussed above with reference to the stator 20.

Figure 16A:
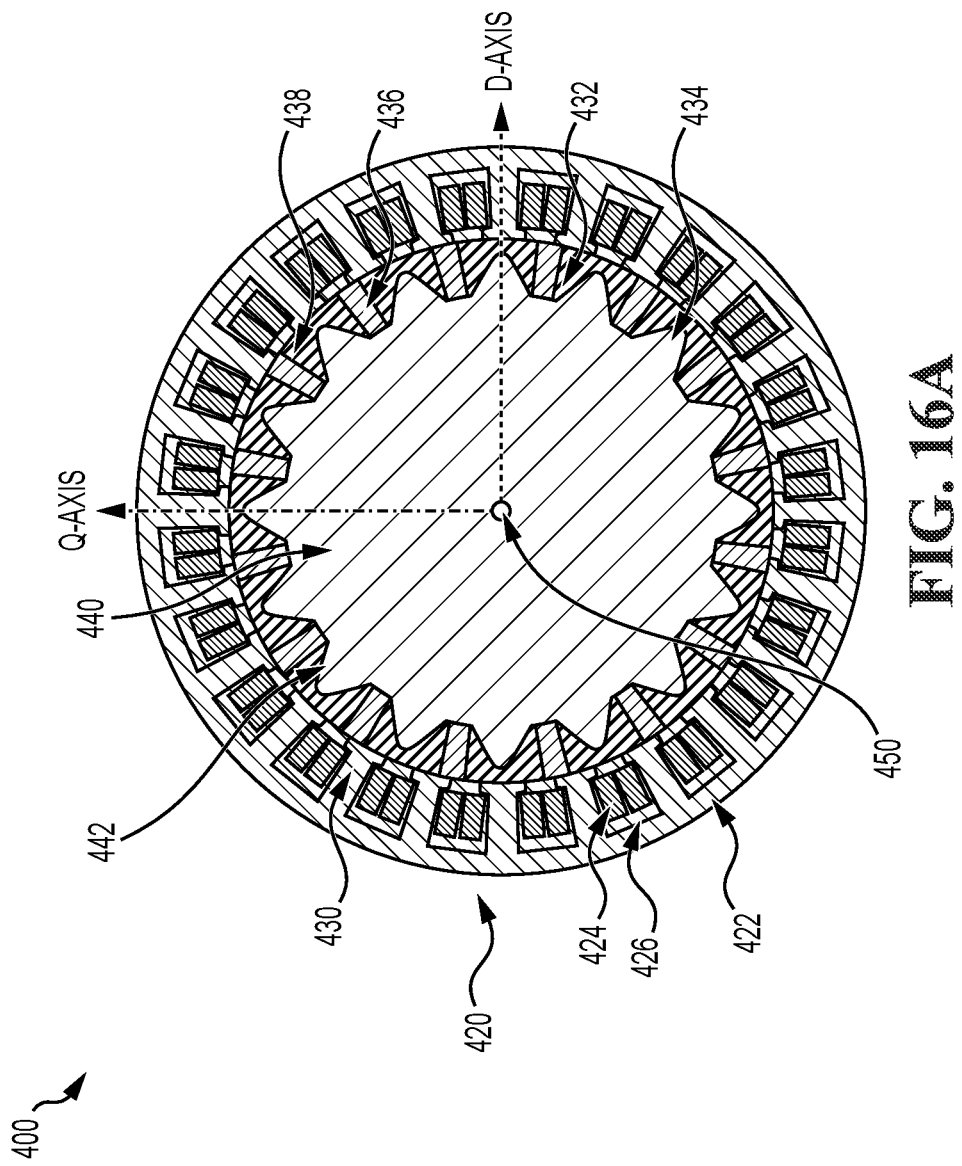
FIG. 16A generally illustrates top view of an electromagnetic machine according to the principles of the present disclosure.

FIG. 16A generally illustrates a top view of an electromagnetic machine 410 according to the principles of the present disclosure. The electromagnetic machine 410 may include any suitable electromagnetic machine, such as an electric motor, generator, or other suitable electromagnetic machine. The electromagnetic machine 410 may include features similar to or different from other machines described herein. The electromagnetic machine 410 includes a stationary component, such as a stator 420 and a rotatable or moveable component, such as a rotor 430. As described, energy flows through the stator 420 to or from the rotor 430, causing the rotor 430 to rotate.

The stator 420 includes a back plate 422. The back plate 422 may comprise any suitable material, such as iron or other suitable material. The back plate 422 includes a substantially circular profile having an outer diameter and an inner diameter. The inner diameter may define a bore that is configured to receive the rotor 430.

The stator 420 includes a plurality of electrical conductors 424 comprising a magnetic core that includes one or more magnetic components. The electrical conductors 424 are disposed in corresponding recesses 426 radially disposed on the back plate 422. The magnetic core of the electrical conductors 424 may be wound in one or more windings of conductive wire, such as copper wire or other suitable conductive wire.

The electrical conductor 424 windings may include concentrated windings having a relatively reduced or minimum end winding length. The concentrated windings may include a coil span of 1, which may reduce the end-winding length relative to other typical windings, such as distributed windings. Additionally, or alternatively, the concentrated windings having a coil span of 1 which may result in relatively high stator slot fill factor and a relatively low stator winding resistance and/or phase. A relatively low resistance may result in relatively low stator copper losses and relatively high operating efficiency.

In some embodiments, the back plate 422 of the stator 420 may include reduced or minimum back iron, which may reduce an amount of steel or other material used in the back plate 422 and/or the stator 420. Additionally, or alternatively, the concentrated windings of the electrical conductors 424 may provide a relatively short flux path, which allows for the back plate 422 to include a reduced back iron length (e.g., compared to stators having distributed windings).

In some embodiments, the rotor 430 includes a body 432 comprising a substantially circular profile having an outer diameter that corresponds to the inner diameter of the stator 420. Additionally, or alternatively, the rotor 430 includes an inner diameter defining a central bore. The body 432 may comprise a non-conductive material, such as aluminum or other suitable material. In some embodiments, the body 432 includes one or more apertures 434 radially deposed around the inner diameter of the body 432.

The rotor 430 includes one or more magnets 436 radially disposed on the body 432. The magnets 436 may include permanent magnets or other suitable magnet. For example, the magnets 436 may include neodymium (NdFeB) magnets, ferrite magnets, or other suitable magnets. The magnets 436 are disposed in corresponding recesses 438 of the body 432. The recesses 438 extend from proximate the inner diameter of the body 432 to proximate the outer diameter of the body 432.

Figure 16B:
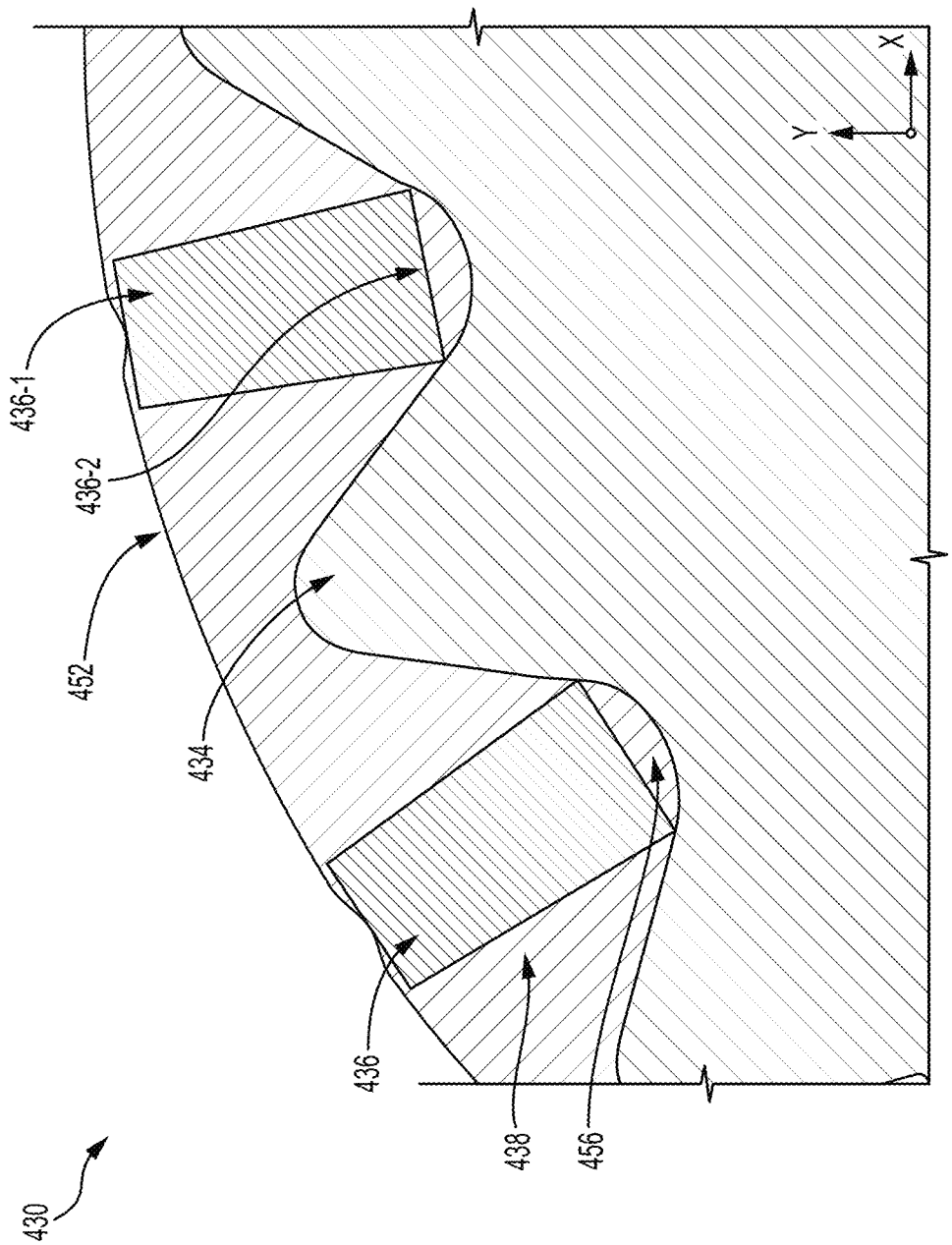
FIGS. 16B and 16C generally illustrate a top view of a portion of a rotor of according to the principles of the present disclosure.
Figure 16C:
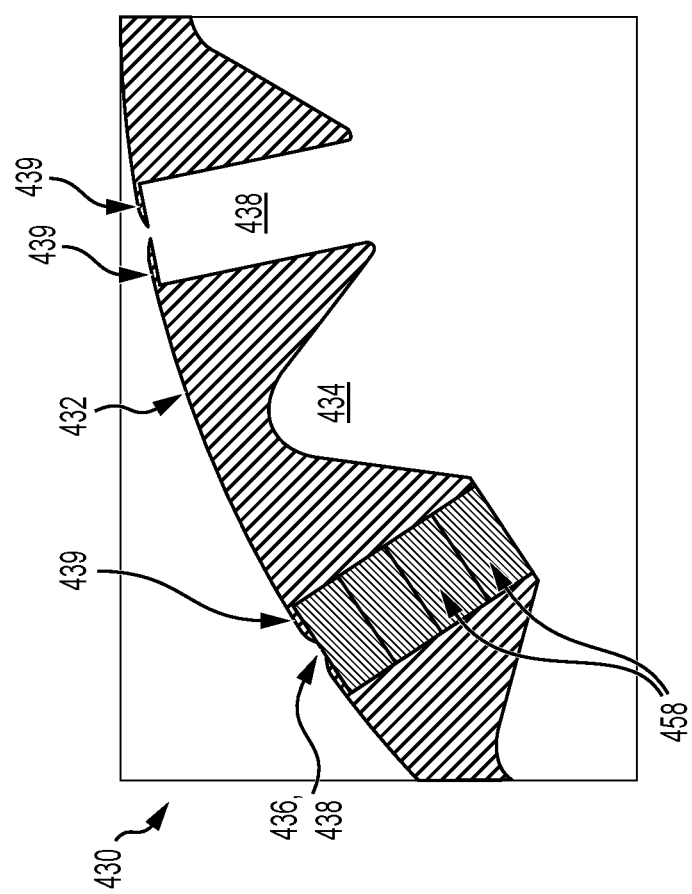

FIGS. 16B and 16C generally illustrate a top view of a portion of the rotor 430. In some embodiments, magnets 436 include a first end 436-1 disposed proximate an outer portion 452 of the rotor 430 and a second end 436-2 disposed proximate the inner diameter of the rotor 430 (e.g., opposite the first end 436-1). In some embodiments, the first end 436-1 may include a width dimension that is smaller than a width dimension of the second end 436-2. For example, the magnets 436 may include a trapezoidal profile, such that respective first ends 436-1 are relatively narrower than respective second ends 436-2.

Accordingly, the recesses 438 may include a profile corresponding to the profile of the magnets 436, such that the recesses 438 retain the magnets 436 and/or restrict movement (e.g., without additional material or structure) of the magnets 436 toward the outer portion 452 of the rotor 430. For example, as shown in FIG. 16C, the body of the rotor 430 may define lips 439 that overlie each of the recesses 438. The lips 439 may be configured to retain the magnets 436 in a corresponding one of the recesses 438 by blocking the magnets 436 from moving radially outwardly.

Figure 16D:
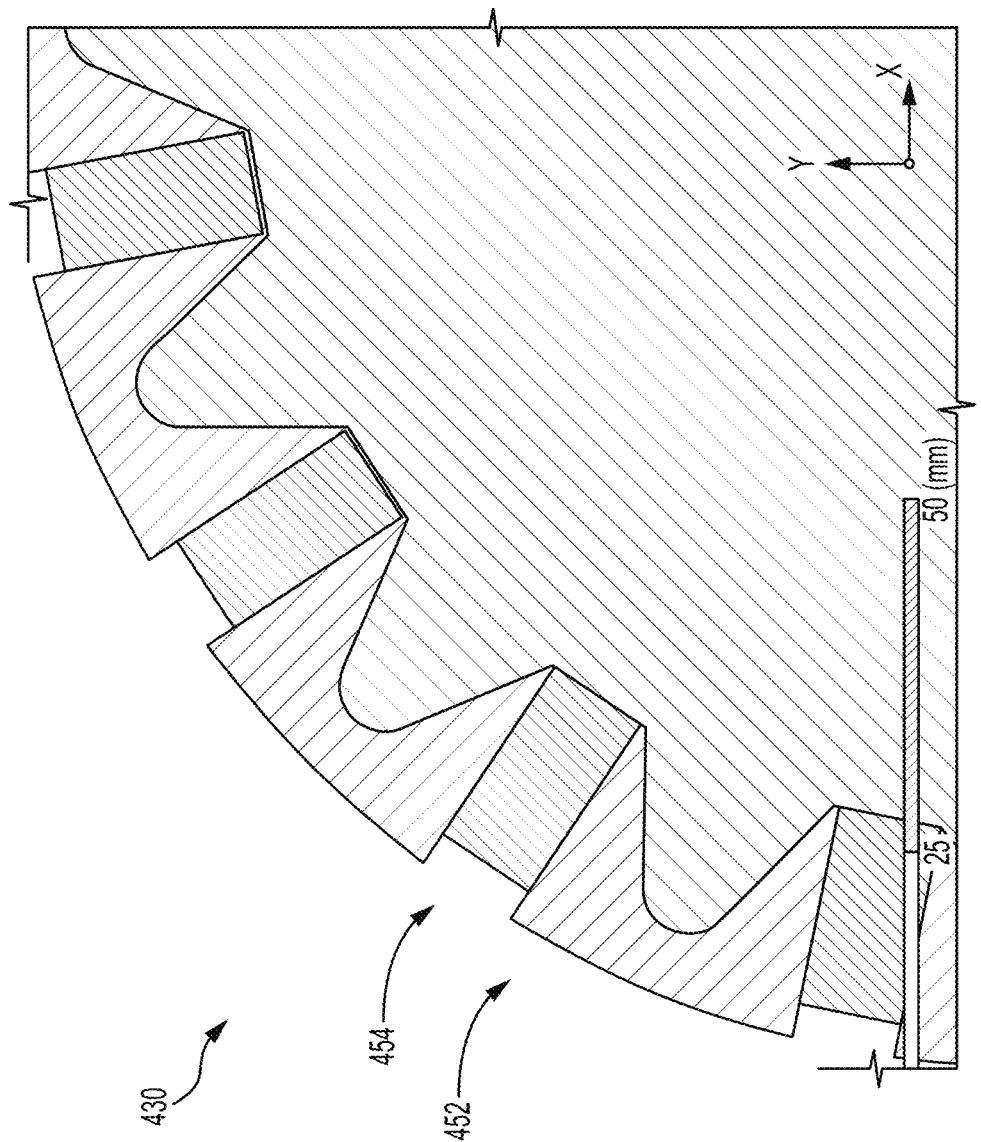
FIG. 16D generally illustrates a top view of a portion of an alternative rotor according to the principles of the present disclosure.

In some embodiments, the outer portion 452 of the rotor 430 may be continuous or may be segmented. For example, as is generally illustrated in FIG. 16D, the outer portion 452 may be segmented, such that the outer portion 452 defines air gaps 454 proximate respective first ends 436-1 of respective magnets 436. Additionally, or alternatively, air gaps 456 may be defined by the rotor 430, opposite the air gaps 454. The air gaps 456 may be disposed proximate respective second ends 436-2 of respective magnets 436.

In some embodiments, as is generally illustrated in FIG. 16C, the magnets 436 may be segmented into a plurality of segments 458. For example, the magnets 436 may be axially and/or radially segmented. Segmenting the magnets 436 may reduce magnet loss. In operation, eddy currents in the magnets 436 flow perpendicular to magnet flux of the magnets 436. Accordingly, radial and axial segmentation of the magnets 436 may prevent a continuous flow of eddy currents.

In some embodiments, the rotor 430 may provide relatively increased reluctance torque component that may be a result of the placement of the magnet 436 in the rotor 430 and a flux focusing arrangement of the rotor 430. This may provide for an increase in d-axis inductance and decrease in q-axis inductance, which may improve a saliency ratio that is typically near unity for stators having concentrated winding. Accordingly, the rotor 430 may include a fewer number of magnets 436 than typical rotors, which may lower the manufacturing costs associated with the rotor 430.

The electromagnetic machine 410 may include an engaging member 440 having a dimeter that corresponds to the inner diameter of the rotor 430. The engaging member 440 may be centrally disposed in the electromagnetic machine 410 and may be configured to engage and/or be connected with a shaft 450 that is axially disposed within the central bore of the rotor 430, which may provide a relatively high flux linkage with the stator 420. The engaging member 440 may include a gear like structure and may comprise a non-conductive material, such as aluminum, or other suitable non-conductive material. The arrangement of the engaging member 440 may allow for relatively less material in the rotor 430 (e.g., less steel used to manufacture the rotor 430).

The engaging member 440 may include a plurality of engaging components 442 radially disposed around the engaging member 440. The engaging components 442 include a profile that corresponds to a profile of the apertures 434 of the rotor 430. In some embodiments, the engaging components 442 are configured to engage the apertures 434 of the rotor 430, such that the rotor 430 is in mechanical communication with the shaft 450, via the engaging member 440.

In operation, an electrical current is applied or induced in the electrical conductors 424 of the stator 420 to generate a magnetic field that transfers energy to or from the magnets 436 of the rotor 430, which may cause the rotor 430 to rotate about the shaft 450, via the engaging member 440. In some embodiments, the magnets 436 may be retained or restricted from movement by a portion of the engaging member 440. This may direct magnetic flux generated by magnets 436 toward the air gap 454, the air gap 456, the stator 420, or a combination thereof. Additionally, or alternatively, air flowing through the electromagnetic machine 410 resulting from rotation of the rotor 430 may be forced or directed toward the air gaps 454 and/or the air gaps 456, which may provide natural cooling for the rotor 430 during operation.

In some embodiments, the electromagnetic machine 410 may output a peak-peak torque ripple value less than 1% of a motor peak torque. Additionally, or alternatively, the recesses 438 of the rotor 430, magnetic poles of respective magnets 436, and/or phases of the respective magnets 436 may provide relatively lower torque ripple, relatively lower forces, and relatively lower cogging torque. In some embodiments, segmenting the magnets 436 axially and/or skewing or adjusting a position of the segments 458 of each respective magnet 436 by a relatively small angle for each segment 458, may decrease the torque ripple and cogging torque significantly. In some embodiments, the spoke like placement of the magnets 436 in the rotor 430 may provide a relatively lower torque ripple and cogging torque.

In some embodiments, an electromagnetic machine includes a stator that includes a back plate and a plurality of electrical conductors radially disposed on the back plate. The electromagnetic machine also includes a rotor that includes a body having an outer diameter corresponding to an inner diameter of the stator and at least one magnet having a first end disposed proximate the stator and a second end disposed opposite the first end. The electromagnetic machine also includes an engaging member disposed on a shaft that extends axially relative to the rotor, the engaging member being configured to engage at least one recessed portion of the rotor.

In some embodiments, the first end of the at least one magnet has a width that is smaller than a width of the second end of the at least one magnet. In some embodiments, the at least one magnet includes a ferrite magnet. In some embodiments, the at least one magnet includes a neodymium magnet. In some embodiments, the body of the rotor includes a non-conducting material. In some embodiments, the non-conducting material includes aluminum. In some embodiments, the engaging member includes a non-conducting material. In some embodiments, the non-conducting material includes aluminum. In some embodiments, the engaging member is configured to direct flux generated by the at least one magnet toward a corresponding air gap in the rotor. In some embodiments, the first end of the at least one magnet includes a trapezoidal profile.

In some embodiments, an electric machine includes a stator including a core, the core including a yoke having a plurality of teeth extending radially from the yoke, the core defining a slot between two adjacent teeth of the plurality of teeth. The electric machine also includes a first winding of electrically-conductive material extending through the slot adjacent a first tooth of the plurality of teeth and a second winding of electrically-conductive material extending through the slot adjacent a second tooth of the plurality of teeth. The electric machine also includes a cooling channel extending through the slot and configured to convey a coolant fluid for removing heat from the stator.

In some embodiments, the electric machine also includes a rotor configured to rotate, each of the teeth extends radially from the yoke to a distal end adjacent to the rotor and the cooling channel extends through the slot between the distal ends of the teeth and on a side of the first winding and the second winding radially adjacent to the rotor. In some embodiments, each of the teeth defines a trunk with a generally rectangular cross-section extending radially from the yoke to a distal end. In some embodiments, the first winding and the second winding define a wedge-shaped space therebetween and within the slot. In some embodiments, the cooling channel extends through the wedge-shaped space. In some embodiments, the slot includes a bottom cavity extending along the yoke and radially away from the yoke to at least one of the first winding or the second winding. In some embodiments, the cooling channel extends through the bottom cavity. In some embodiments, the cooling channel includes a supply conduit and a return conduit with a partition disposed therebetween. In some embodiments, the partition defining a passage between the supply conduit and the return conduit for directing the coolant fluid onto a predetermined region of the return conduit as an impinging jet. In some embodiments, the cooling channel includes a first supply line configured to convey a first stream of the coolant fluid. In some embodiments, the cooling channel includes a second supply line configured to convey a second stream of the coolant fluid. In some embodiments, the first stream and the second stream converge from opposite directions at a convergence region to generate a turbulence within the coolant fluid.

In some embodiments, an apparatus includes a stator that includes a back plate and a plurality of electrical conductors radially disposed on the back plate and a rotor configured to rotate relative to the stator and defining an air gap between the rotor and the stator. The rotor includes a body having an outer diameter corresponding to an inner diameter of the stator and of permanent magnets disposed upon the body and adjacent to the air gap. The rotor defines a trough extending circumferentially between adjacent ones of the plurality of permanent magnets, the trough extending radially from the body toward the stator. The apparatus also includes a cooling channel extending through the trough and configured to convey a coolant fluid and an engaging member disposed on a shaft that extends axially relative to the rotor, the engaging member being configured to engage at least one recessed portion of the rotor.

In some embodiments, the plurality of permanent magnets includes at least one ferrite magnet. In some embodiments, the plurality of permanent magnets includes at least one neodymium magnet. In some embodiments, the body of the rotor includes a non-conducting material.

In some embodiments, an electric machine includes: a stator including a core, the core including a yoke having an annular cross-section and a plurality of teeth extending radially from the yoke, with adjacent ones of the teeth defining a slot therebetween; a winding of electrically-conductive material extending through the slot; a coil carrier of non-conductive material extending through the slot between the winding and an adjacent one of the teeth; and the coil carrier defining a cooling channel extending through the slot between the winding and the adjacent one of the teeth, with the cooling channel configured to convey a coolant fluid for removing heat from the stator.

In some embodiments, an electric machine includes: a stator; a rotor configured to rotate relative to the stator and defining an air gap between the rotor and the stator; the rotor including a body and a plurality of permanent magnets disposed upon the body and adjacent to the air gap; the rotor defining a trough extending circumferentially between adjacent ones of the plurality of permanent magnets, the trough extending radially from the body toward the stator; and a cooling channel extending through the trough and configured to convey a coolant fluid.

In some embodiments, an electric machine includes: a stator; a rotor configured to rotate about an axis; a heat pipe including an evaporator tube extending axially through the rotor, and a condenser disposed at or adjacent to an axial end of the rotor; the heat pipe configured to absorb heat from the rotor by evaporating a refrigerant within the evaporator tube and to transfer the heat away from the rotor by condensing the refrigerant to a liquid within the condenser; a nozzle configured to direct a cooling fluid upon the axial end of the rotor for transferring heat from the condenser.

In some embodiments, an electric machine including: a stator; a rotor including a rotor body configured to rotate about an axis; a plurality of recesses within the rotor, each of the recesses extending axially outwardly from an inner surface of the rotor and defining a ledge extending generally circumferentially and facing axially outwardly.

In some embodiments, one or more of the recesses has a cross-sectional shape of a Christmas-tree comprising two or more overlapping triangles.

In some embodiments, an electric machine including: a stator; a rotor configured to rotate with a shaft about an axis; at least one of the stator or the rotor defining a plurality of cooling channels extending axially; and a fan attached to an axial end of the shaft and configured to circulate air through the plurality of cooling channels.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications. It should be understood that the features of the various embodiments described herein may be combined in any suitable fashion other than those described.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An electric machine comprising:
   a rotor configured to rotate;
   a stator including a core, the core including a yoke having a plurality of teeth extending radially from the yoke to a distal end adjacent to the rotor, the core defining a slot between two adjacent teeth of the plurality of teeth;
   a first winding of electrically-conductive material extending through the slot adjacent a first tooth of the plurality of teeth;
   a second winding of electrically-conductive material extending through the slot adjacent a second tooth of the plurality of teeth;
   a cooling channel extending through the slot and configured to convey a coolant fluid for removing heat from the stator,
   the cooling channel comprising a supply conduit and a return conduit with a partition disposed therebetween;
   the partition defining a passage between the supply conduit and the return conduit for directing the coolant fluid onto a predetermined region of the return conduit as an impinging jet,
   wherein the cooling channel extends through at least one of:
      a space between the distal ends of the teeth and on a side of the first winding and the second winding radially adjacent to the rotor; or
      a bottom cavity between the yoke and a bottom surface of at least one of the first winding or the second winding, wherein the at least one of the first winding or the second winding extends from the bottom surface in a radial direction away from the yoke.

2. An electric machine comprising:
   a rotor configured to rotate;
   a stator including a core, the core including a yoke having a plurality of teeth extending radially from the yoke to a distal end adjacent to the rotor, the core defining a slot between two adjacent teeth of the plurality of teeth;
   a first winding of electrically-conductive material extending through the slot adjacent a first tooth of the plurality of teeth;
   a second winding of electrically-conductive material extending through the slot adjacent a second tooth of the plurality of teeth;
   a cooling channel extending through the slot and configured to convey a coolant fluid for removing heat from the stator,
   wherein the cooling channel includes a first supply line configured to convey a first stream of the coolant fluid;
   wherein the cooling channel includes a second supply line configured to convey a second stream of the coolant fluid;
   wherein the first stream and the second stream converge from opposite directions at a convergence region to generate a turbulence within the coolant fluid; and
   wherein the cooling channel extends through at least one of:
      a space between the distal ends of the teeth and on a side of the first winding and the second winding radially adjacent to the rotor; or
      a bottom cavity between the yoke and a bottom surface of at least one of the first winding or the second winding, wherein the at least one of the first winding or the second winding extends from the bottom surface in a radial direction away from the yoke.

* * * * *